US012594702B2

(12) United States Patent
Jaidka

(10) Patent No.: US 12,594,702 B2
(45) Date of Patent: Apr. 7, 2026

(54) MACHINE AND METHOD FOR INJECTION MOLDING MULTILAYER ARTICLES HAVING A HIGH PROPORTION OF INTERNAL LAYER MATERIAL

(71) Applicant: Husky Injection Molding Systems Ltd., Bolton (CA)

(72) Inventor: Damish Jaidka, Brampton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 176 days.

(21) Appl. No.: 18/249,279

(22) PCT Filed: Sep. 17, 2021

(86) PCT No.: PCT/CA2021/051300
§ 371 (c)(1),
(2) Date: Apr. 17, 2023

(87) PCT Pub. No.: WO2022/082297
PCT Pub. Date: Apr. 28, 2022

(65) Prior Publication Data
US 2023/0390983 A1 Dec. 7, 2023

Related U.S. Application Data

(60) Provisional application No. 63/094,559, filed on Oct. 21, 2020.

(51) Int. Cl.
*B29C 45/16* (2006.01)
*B29B 11/08* (2006.01)
(Continued)

(52) U.S. Cl.
CPC .......... *B29C 45/1643* (2013.01); *B29B 11/08* (2013.01); *B29C 45/1646* (2013.01);
(Continued)

(58) Field of Classification Search
CPC ........ B29C 45/1603; B29C 2949/3028; B29C 2949/302; B29C 2949/22; B29C 2949/24;
(Continued)

(56) References Cited

U.S. PATENT DOCUMENTS 4,990,301 A 2/1991 Krishnakumar et al.
5,035,931 A * 7/1991 Yamada .............. B29C 45/1643
264/28
(Continued)

FOREIGN PATENT DOCUMENTS

CA 2303766 A1 5/1999
CN 85106542 A 3/1987
(Continued)

OTHER PUBLICATIONS

Extended European Search Report for European Application No. 21881403.6 dated Aug. 23, 2024.

*Primary Examiner* — Armand Melendez
(74) *Attorney, Agent, or Firm* — Wolf, Greenfield & Sacks, P.C.

(57) ABSTRACT

In one aspect, a method of coinjection molding a multilayer article using a coinjection nozzle having inner outlet, an outer outlet, and an intermediate outlet between the inner and outer outlets is provided. A stream of surface layer material is injected into a mold cavity from the intermediate outlet. With the injection ongoing, two streams of internal layer material are injected from the inner and outer outlets of the coinjection nozzle respectively. The two streams sandwich the stream of surface layer material and flow behind a melt front of the surface layer material. The sandwiched stream of surface layer material continues to supply the melt front with surface layer material at least until the melt front nears a distal end of the mold cavity. The resultant article is substantially or entirely encapsulated by (Continued)

a skin of the surface layer material and contains a high proportion of internal layer material.

9 Claims, 20 Drawing Sheets

(51) Int. Cl.

| | |
|---|---|
| *B29C 45/20* | (2006.01) |
| *B29C 45/77* | (2006.01) |
| *B32B 1/08* | (2006.01) |
| *B32B 27/08* | (2006.01) |
| *B32B 27/36* | (2006.01) |
| *B29K 67/00* | (2006.01) |
| *B29L 9/00* | (2006.01) |
| *B29L 23/00* | (2006.01) |

(52) U.S. Cl.
CPC .............. *B29C 45/20* (2013.01); *B29C 45/77* (2013.01); *B32B 1/08* (2013.01); *B32B 27/08* (2013.01); *B32B 27/36* (2013.01); *B29C 2045/1612* (2013.01); *B29C 2945/76498* (2013.01); *B29C 2945/76585* (2013.01); *B29C 2949/3016* (2022.05); *B29C 2949/3036* (2022.05); *B29K 2067/003* (2013.01); *B29L 2009/00* (2013.01); *B29L 2023/00* (2013.01); *B32B 2250/03* (2013.01); *B32B 2250/244* (2013.01); *B32B 2250/40* (2013.01)

(58) Field of Classification Search
CPC ............ B29C 45/1643; B29C 45/1646; B29C 2949/3016; B29C 2949/3018; B29C 2949/3036; B29C 2949/303; B29C 2949/3032; B29C 45/1642; B29C 2949/3038; B29C 45/1607; B29C 45/2725; B29C 2045/1648; B29C 2949/0811; B29C 2949/0819; B29C 2949/0829; B29C 2949/3012; B29C 49/06; B29C 2045/273; B29C 2949/0715; B29C 2949/28; B29C 2949/3008; B29C 45/02; B29C 49/071; B29C 2949/082; B29C 2045/165; B29C 2045/1656; B29C 2049/023; B29C 2949/072; B29C 2949/073; B29C 2949/0777; B29C 2949/3026; B29C 2949/0723; B29C 2949/0724; B29C 2949/0732; B29C 2949/0733; B29C 2949/0773; B29C 2949/3022; B29C 45/0046; B29C 49/22; B29C 2045/161; B29C 2045/1612; B29C 2045/1614; B29C 2045/1668; B29C 2045/1685; B29C 2045/1698; B29C 2045/2687; B29C 2045/277; B29C 2045/2872; B29C 2793/009; B29C 2949/0774; B29C 2949/0817; B29C 2949/0835; B29C 2949/0837; B29C 2949/0872; B29C 2949/3009; B29C 45/1657; B29C 45/1684; B29C 49/0005; B29C 49/74; B29C 2045/0051; B29C 2045/1651; B29C 2045/166; B29C 2045/1667; B29C 2049/222; B29C 2049/7832; B29C 2049/7862; B29C 2049/7879; B29C 2949/077; B29C 2949/0772; B29C 2949/0816; B29C 2949/20; B29C 2949/26; B29C 2949/3014; B29C 2949/3034; B29C 2949/3074; B29C 2949/3076; B29C 37/0078; B29C 37/0082; B29C 45/13; B29C 45/16; B29C 45/164; B29C 45/1645; B29C 45/22; B29C 45/2708; B29C 45/2756; B29C 45/30; B29C 45/54; B29C 45/706; B29C 48/03; B29C 48/185; B29C 49/04; B29C 49/08; B29C 49/087; B29C 49/42394; B29C 49/6605; B29C 49/761

See application file for complete search history.

(56) References Cited

U.S. PATENT DOCUMENTS

| | | | | |
|---|---|---|---|---|
| 5,049,345 | A | * | 9/1991 | Collette .............. B29C 45/1643 |
| | | | | 264/513 |
| 5,098,274 | A | * | 3/1992 | Krishnakumar .... B29C 45/1646 |
| | | | | 425/562 |
| 5,935,614 | A | | 8/1999 | Blank et al. |
| 5,972,258 | A | | 10/1999 | Sicilia |
| 6,062,840 | A | | 5/2000 | Lee et al. |
| 6,274,075 | B1 | | 8/2001 | Gellert et al. |
| 6,648,622 | B1 | | 11/2003 | Gellert et al. |
| 6,908,581 | B2 | | 6/2005 | Sabin et al. |
| 7,704,433 | B2 | | 4/2010 | Sicilia |
| 9,096,003 | B2 | | 8/2015 | Toyoda et al. |
| 10,392,152 | B2 | | 8/2019 | Hosokoshiyama |
| 2019/0111598 | A1 | | 4/2019 | Thom |

FOREIGN PATENT DOCUMENTS

| | | | |
|---|---|---|---|
| EP | 2629952 | B1 | 9/2019 |
| EP | 911136 | B1 | 6/2022 |
| GB | 1428789 | A | 3/1976 |
| JP | H03-26523 | A | 2/1991 |
| JP | 4931289 | B2 | 5/2012 |
| WO | WO 2007/140447 | A1 | 12/2007 |

* cited by examiner

100

106

104

108

109

102

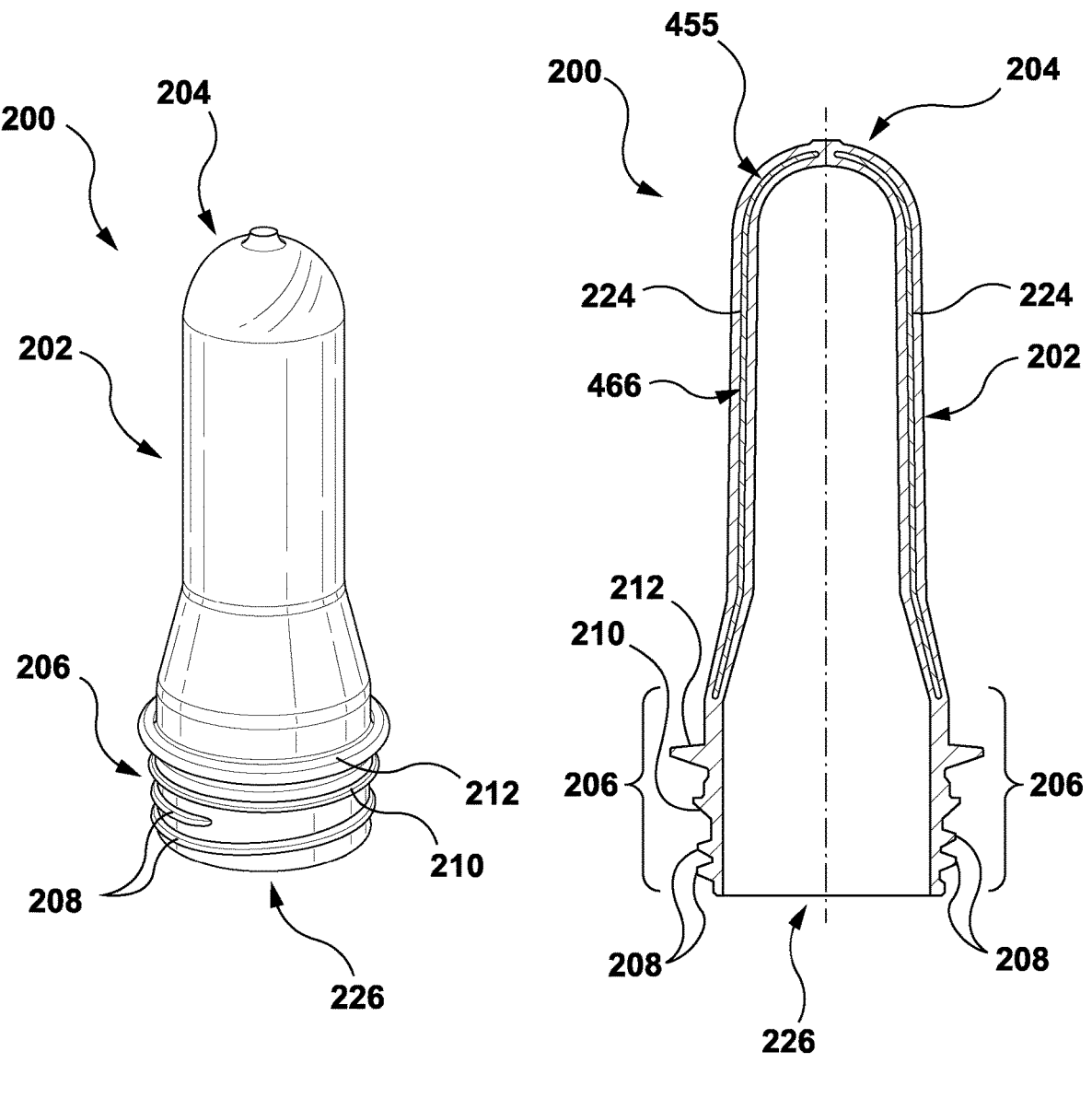
FIG. 2        FIG. 3

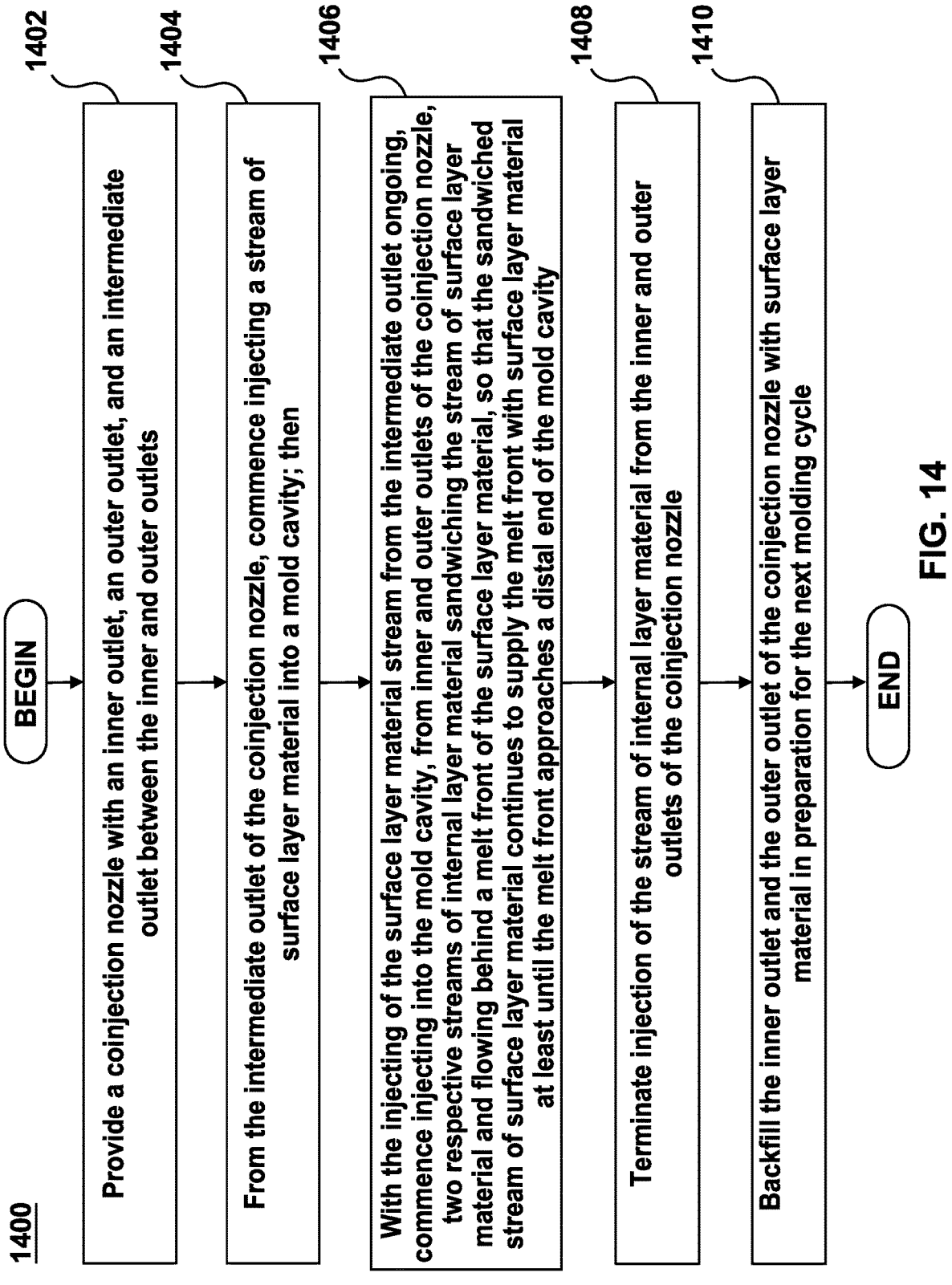

1400

BEGIN

1402
Provide a coinjection nozzle with an inner outlet, an outer outlet, and an intermediate outlet between the inner and outer outlets 1404
From the intermediate outlet of the coinjection nozzle, commence injecting a stream of surface layer material into a mold cavity; then 1406
With the injecting of the surface layer material stream from the intermediate outlet ongoing, commence injecting into the mold cavity, from inner and outer outlets of the coinjection nozzle, two respective streams of internal layer material sandwiching the stream of surface layer material and flowing behind a melt front of the surface layer material, so that the sandwiched stream of surface layer material continues to supply the melt front with surface layer material at least until the melt front approaches a distal end of the mold cavity 1408
Terminate injection of the stream of internal layer material from the inner and outer outlets of the coinjection nozzle 1410
Backfill the inner outlet and the outer outlet of the coinjection nozzle with surface layer material in preparation for the next molding cycle

END

FIG. 14

MACHINE AND METHOD FOR INJECTION MOLDING MULTILAYER ARTICLES HAVING A HIGH PROPORTION OF INTERNAL LAYER MATERIAL

RELATED APPLICATIONS

This Application is a national stage filing under 35 U.S.C. 371 of International Patent Application Serial No. PCT/CA2021/051300, filed Sep. 17, 2021, which claims priority to U.S. Provisional Application Ser. No. 63/094,559, filed Oct. 21, 2020.

TECHNICAL FIELD

The present disclosure relates to a machine and a method for injection molding multilayer articles having a high proportion of internal layer material, as well as to the resulting injection-molded multilayer articles.

BACKGROUND

An injection molding machine may channel a flow of melted molding material, such as melted plastic or resin, through a distribution network, such as a hot runner, for dispensing into a mold through a nozzle. Melted molding material may be dispensed or injected into a mold cavity for molding an article having a generally tubular shape, such as a preform suitable for subsequent blow-molding into container such as a plastic beverage bottle for example. The flow of injected molding material may enter the gate of the mold cavity and may surround a core insert component of the mold in a cylindrical flow.

A multi-channel coinjection nozzle having multiple outlets for simultaneously dispensing multiple respective layers of material may be used to form multilayer molded articles. For example, it is known for a coinjection nozzle to dispense inner and outer melt streams of a surface layer (or "skin layer") material simultaneously with a stream of an internal layer (or "core layer") material sandwiched between the inner and outer streams. The surface layer material may for example be polyethylene terephthalate (PET), possibly with an added colorant. The internal layer material may for example comprise nylon or a barrier material (e.g. an oxygen scavenger material) suitable for protecting subsequent contents of the molded article from external contamination (e.g. oxidation). In another example, the internal layer material may be recycled PET.

It may be desirable for the internal layer material to be encapsulated within the surface layer material in the resultant molded article. For example, molded articles that are ultimately intended to contain a food or beverage may have an internal layer that is made from a non-food grade material, e.g. a material made from recycled plastic. Exposure of the internal layer on an interior surface of the container may undesirably expose the contained food or beverage to impurities in the non-food grade material. Exposure of the internal layer on an exterior surface of the container may detrimentally affect the appearance of the container.

For various reasons, it may be desirable to maximize a proportion of the internal layer material in a multilayer article. One reason may be to minimize material costs, e.g. when the internal layer material is less expensive than the surface layer material. Another reason may be to conserve natural resources, e.g. when the internal layer material is a recycled plastic and the surface layer material is virgin plastic. However, multilayer articles manufactured using conventional coinjection molding techniques tend to contain only a limited proportion of internal layer material.

SUMMARY

According to one aspect of the present disclosure, there is provided an injection molding machine for molding a multilayer article, comprising: a coinjection nozzle having an inner channel, an outer channel, and an intermediate channel terminated by an inner outlet, an outer outlet, and an intermediate outlet respectively, the intermediate outlet being between the inner and outer outlets; a surface layer material injection unit; an internal layer material injection unit; and a hot runner defining: a first passageway for conveying surface layer material from the surface layer material injection unit to the intermediate channel of the coinjection nozzle; and a second passageway for conveying internal layer material from the internal layer material injection unit to the inner and outer channels of the coinjection nozzle.

In some embodiments, the injection molding machine further comprises a mold cavity associated with the coinjection nozzle; and a controller operable to: cause surface layer material injection unit to commence injection into the mold cavity of a stream of the surface layer material from the intermediate outlet of the coinjection nozzle; then with the injection of the surface layer material stream from the intermediate outlet ongoing, cause the internal layer material injection unit to inject into the mold cavity, from the inner and outer outlets of the coinjection nozzle, two respective streams of the internal layer material, the two streams of internal layer material sandwiching the stream of surface layer material and flowing behind a melt front of the surface layer material, so that the sandwiched stream of surface layer material continues to supply the melt front with surface layer material at least until the melt front nears a distal end of the mold cavity.

In some embodiments, for example, the controller is operable to cause the internal layer material injection unit to inject an amount of internal layer material that is at least 50% by volume of the multilayer article. The amount may be about 54% by volume of the multilayer article. In other non-limiting embodiments the volume of internal layer material is less than 50%, and as low as 3%.

In some embodiments, the controller is further operable to, at a conclusion of a molding cycle: cause the surface layer material injection unit to apply a hold pressure upon the surface layer material; and cause a pullback stroke to occur at the internal layer material injection unit for reducing a pressure of the internal layer material in the inner and outer channels of the coinjection nozzle, the pressure reduction sufficient to allow the pressurized surface layer material to flow, in an upstream direction, into each of a distal end of the inner channel and a distal end of the outer channel.

According to another aspect of the present disclosure, there is provided a method of molding a multilayer article, comprising: providing a coinjection nozzle with an inner outlet, an outer outlet, and an intermediate outlet between the inner and outer outlets; from the intermediate outlet of the coinjection nozzle, commencing injection into a mold cavity of a stream of surface layer material; then with the injection of the surface layer material stream from the intermediate outlet ongoing, injecting into the mold cavity, from the inner and outer outlets of the coinjection nozzle, two respective streams of internal layer material, the two streams of internal layer material sandwiching the stream of surface layer material and flowing behind a melt front of the surface layer material, so that the sandwiched stream of surface layer material continues to supply the melt front with surface layer material at least until the melt front nears a distal end of the mold cavity.

In some embodiments, the injecting injects an amount of internal layer material that is at least 50% by volume of the multilayer article. The amount may be about 54% by volume of the multilayer article. In other non-limiting embodiments the volume of internal layer material is less than 50%, and as low as 3%.

According to another aspect of the present disclosure, there is provided a tangible medium storing computer-readable program code that, upon execution by a controller of an injection molding machine having a surface layer material injection unit, an internal layer material injection unit, and a coinjection nozzle with an inner outlet, an outer outlet, and an intermediate outlet between the inner and outer outlets, causes the controller to: cause the surface layer material injection unit to commence injecting a stream of surface layer material from the intermediate outlet of the coinjection nozzle into a mold cavity; then with the injection of the surface layer material stream from the intermediate outlet ongoing, cause the internal layer material injection unit to commence injecting into the mold cavity, from the inner and outer outlets of the coinjection nozzle, two respective streams of internal layer material sandwiching the stream of surface layer material and flowing behind a melt front of the surface layer material, so that the sandwiched stream of surface layer material continues to supply the melt front with surface layer material at least until the melt front nears a distal end the mold cavity.

In some embodiments, the computer-readable program code further causes the controller to: cause a hold pressure to be applied to the surface layer material supplying the intermediate outlet of the coinjection nozzle; and cause a pressure of the internal layer material supplying the inner and outer outlets of the coinjection nozzle to be reduced sufficiently to allow the pressurized surface layer material to flow, in an upstream direction, into each of the inner outlet and the outer outlet.

According to another aspect of the present disclosure, there is provided a coinjection-molded multilayer container preform comprising: a tubular body; a base at a closed end of the tubular body; and a neck finish at an open end of the tubular body defining a top sealing surface, wherein the tubular body comprises: a middle layer of a surface layer material; inner and outer layers of an internal layer material sandwiching the middle layer of the surface layer material; and inner and outer skin layers of the surface layer material adjacent to the inner and outer layers, respectively, of the internal layer material, and wherein the middle layer of surface layer material extends through the neck finish to form the top sealing surface.

In some embodiments, the inner and outer layers of internal layer material extend into the base and, in the base, the inner and outer layers of the internal layer material collectively define at least 20% of the thickness of the base.

In some embodiments, the proportion by volume of the internal layer material in the coinjection-molded multilayer container preform is at least 50%. The proportion by volume of the internal layer material may be about 54%. In other non-limiting embodiments the volume of internal layer material is less than 50%, and as low as 3%.

In some embodiments, a thickness of the outer internal layer of the internal layer material and a thickness of the inner internal layer of the internal layer material collectively define at least 50% of the overall thickness of the wall of the tubular body of the coinjection-molded multilayer container preform.

According to another aspect of the present disclosure, there is provided a coinjection-molded multilayer container preform comprising: a tubular body; a base at a closed end of the tubular body; and a neck finish at an open end of the tubular body, wherein a wall of the tubular body has five layers, the five layers being an outer skin layer of a surface layer material adjacent to an outer internal layer of an internal layer material adjacent to a middle layer of the surface layer material adjacent to an inner internal layer of the internal layer material adjacent to an inner skin layer of the surface layer material.

In some embodiments, the proportion by volume of the internal layer material in the coinjection-molded multilayer container preform is at least 50%. The proportion by volume of the internal layer material in the coinjection-molded multilayer container preform may be about 54%.

In some embodiments, a thickness of the outer internal layer of the internal layer material and a thickness of the inner internal layer of the internal layer material collectively define at least 50% of the overall thickness of the wall of the tubular body of the coinjection-molded multilayer container preform.

In some embodiments, the five layers extend into the neck finish of the preform, the five layers being the outer skin layer of the surface layer material adjacent to the outer internal layer of the internal layer material adjacent to the middle layer of the surface layer material adjacent to an inner internal layer of the internal layer material adjacent to the inner skin layer of the surface layer material.

According to another aspect of the present disclosure, there is provided a coinjection-molded multilayer article comprising: a body; a base at a closed end of the body; and a neck at an open end of the body defining an annular edge surface, wherein the body comprises: a middle layer of a surface layer material; inner and outer layers of an internal layer material sandwiching the middle layer of the surface layer material; and inner and outer skin layers of the surface layer material adjacent to the inner and outer layers, respectively, of the internal layer material, and wherein the middle layer of surface layer material extends through the neck to form the annular edge surface.

In some embodiments, the proportion by volume of the internal layer material in the coinjection-molded multilayer article is at least 50%.

Other features will become apparent from the drawings in conjunction with the following description.

DESCRIPTION OF THE DRAWINGS

The non-limiting embodiments will be more fully appreciated by reference to the accompanying drawings, in which:

FIG. 2 is a perspective view of a multilayer preform molded by the injection molding machine of FIG. 1;

FIG. 3 is a longitudinal cross section of the preform of FIG. 2;

FIG. 14 is a flowchart of operation for injection molding a multilayer article with a high proportion of internal layer material using the molding machine of FIG. 12;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE
NON-LIMITING EMBODIMENT(S)

In this document, any use of the term "exemplary" should be understood to mean "an example of" and not necessarily to mean that the example is preferable or optimal in some way. Terms such as "downwardly" and "right" may be used to describe features of some embodiments in this description but should not be understood to necessarily connote an orientation of the embodiments during manufacture or use. References to a "high proportion" of internal layer material in a multilayer injection-molded article do not necessarily denote any absolute lower bound on the amount of internal layer material relative to a total amount of material in the article.

Figure 1:
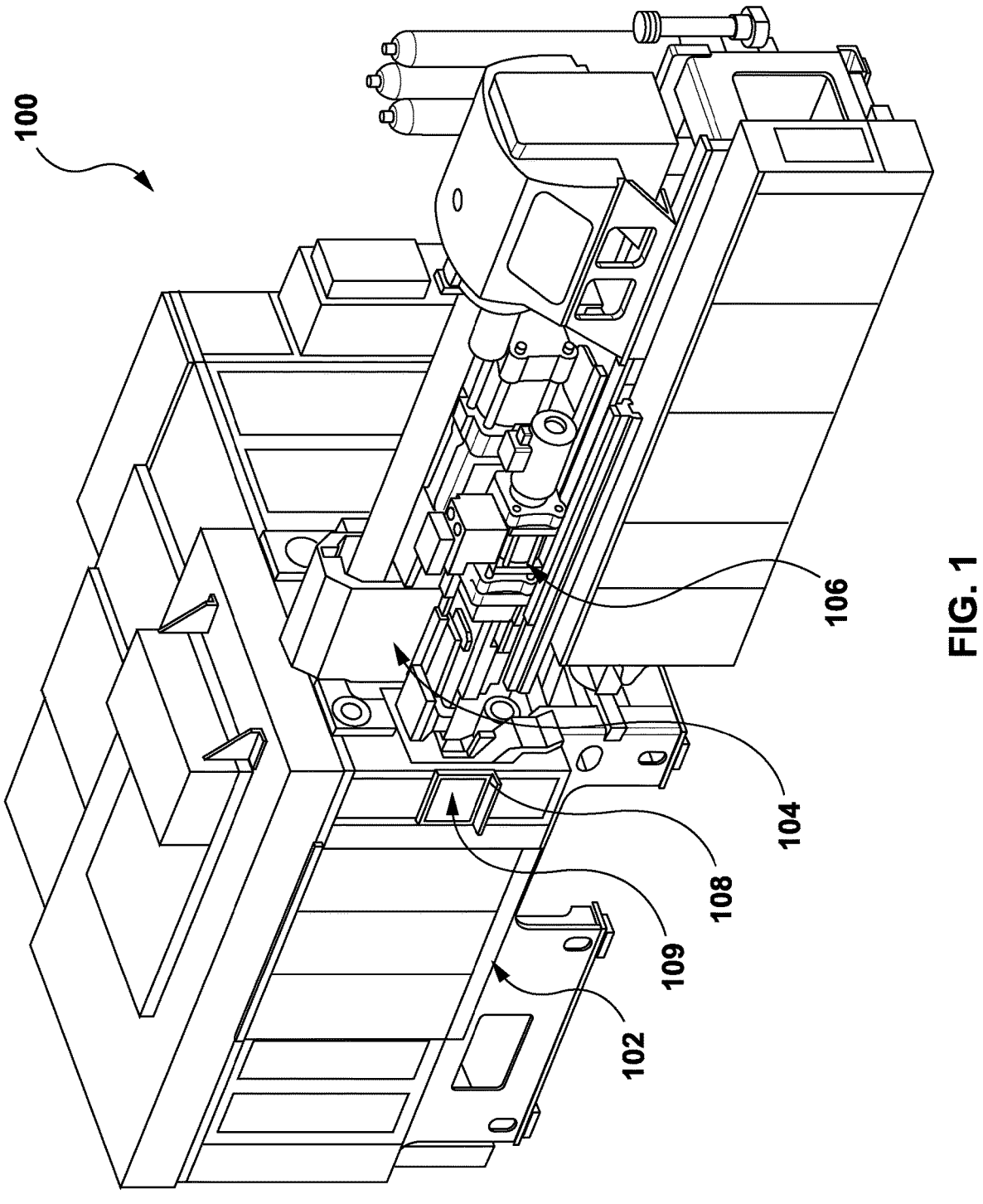
FIG. 1 is a perspective view of a conventional injection molding machine for molding multilayer preforms.

FIG. 1 depicts a conventional injection molding machine 100 in perspective view. The exemplary injection molding machine 100 is for molding multilayer articles, specifically preforms, such as the example preform 200 of FIGS. 2 and 3 (described below).

The injection molding machine 100 depicted in FIG. 1 comprises an enclosure 102 housing a clamp unit, a fixed platen, a movable platen, and a mold mounted therebetween, none of which are visible in FIG. 1. The injection molding machine 100 further comprises first and second injection units 104 and 106, which are for plasticizing (melting) and injecting a surface layer material and an internal layer material respectively (both being forms of molding material) and which may accordingly be referred to herein as the surface layer material injection unit 104 and the internal layer material injection unit 106 respectively. The surface layer material may for example be PET. The internal layer material may for example be nylon, a barrier or oxygen-scavenging material, or a PET material with a colorant additive.

The controller 108 of FIG. 1 controls the operation of injection molding machine 100 based on human operator input or based on a preset control sequence, among other functions. In the present embodiment, the controller 108 comprises at least one processor in communication with volatile or non-volatile memory storing computer-readable program code stored on a tangible medium, e.g., ROM, optical disk, USB drive, or magnetic storage medium. In some embodiments, the computer-readable program code may be transmitted to the memory via a modem or communications adapter communicatively coupled to a network, e.g. a wide area network such as the Internet. The controller 108 may for example be an industrial PC, e.g. a Beckhoff® model CP22xx Panel PC with Intel® Core™ i processor. Control instructions may be entered by a human operator via human-machine interface (HMI) 109, which may for example be a multi-function touchscreen that forms part of, or is coupled to, the controller 108. The HMI 109 may display various graphical user interface (GUI) screens used for controlling or monitoring aspects of the molding process.

A hot runner 388 (not shown in FIG. 1) within enclosure 102 defines a network of passageways for conveying molten surface layer material and molten internal layer material from injection units 104 and 106 respectively to each of a plurality of multi-channel nozzles, described below. Each nozzle is positioned near an associated mold cavity defined in the mold. Each mold cavity is a negative shape (space) in the shape of the article to be molded, which in this example is preform 200 of FIGS. 2 and 3. The number of mold cavities that can be simultaneously filled by molding machine 100 is typically greater than one and may vary between embodiments.

An example container preform 200 produced by the injection molding machine 100 of FIG. 1 is shown in FIG. 2 in perspective view and in FIG. 3 in longitudinal cross section. As illustrated, the preform 200 has an elongate tubular body 202, a domed closed base 204, and a neck finish 206. The neck finish 206 of this example preform includes various external features including threads 208 for accepting and retaining a closure such as a threaded cap, an anti-pilfer bead 210, and a support ledge 212. As will be appreciated, the neck finish area defines the neck of the molded article at or near the opening of the molded article.

As best seen in FIG. 3, the preform 200 is made primarily from the surface layer material 455, with the exception of internal segment 224, which is comprised of the internal layer material 466. The internal segment 224 is entirely encapsulated by the surface layer material 455 in this embodiment. The orientation of the preform 200 in FIGS. 2 and 3 is inverted, i.e. the open end 226 opposite base 204 points downwardly. This is not necessarily the orientation in which preforms are molded in practice by molding machine 100 or alternative machine embodiments.

It will be appreciated that the distribution of internal layer material 466 and surface layer material 455 within the article 200 is depicted schematically in FIG. 3. The actual distribution of materials 455, 466 within manufactured articles 200 may differ. A sample distribution in a manufactured prototype article is shown in FIG. 11, described below.

Figure 4:
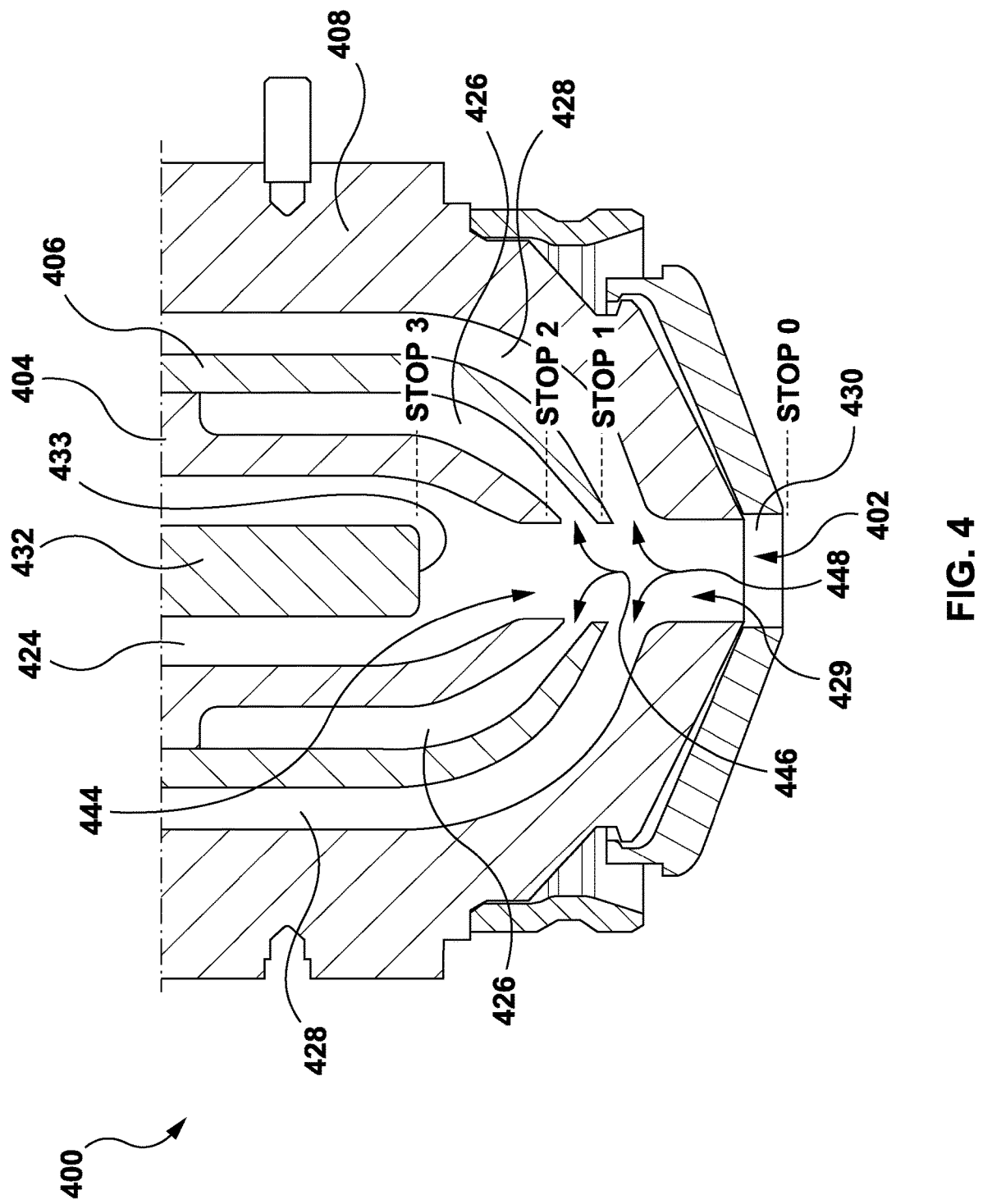
FIG. 4 is a longitudinal cross section of a portion of a hot runner coinjection nozzle used to inject molding material to form the preform of FIGS. 2 and 3.

The preform 200 of FIGS. 2 and 3 is formed from molten surface layer material 455 and molten internal layer material 466 injected into a mold cavity by an associated multi-channel coinjection nozzle 400 of the hot runner. FIG. 4 depicts a portion of the coinjection nozzle 400 in longitudinal cross section. The depicted portion of nozzle 400 is the downstream-most end of the nozzle, including the nozzle tip 402 from which melt is discharged into the mold cavity.

In the present embodiment, nozzle 400 is an assembly formed from three nested components: an innermost nozzle insert 404, an intermediary nozzle insert 406, and an outermost nozzle insert 408. In alternative embodiments, the nozzle may be formed in other ways, e.g. as a unitary component made using additive manufacturing techniques, such as direct metal laser sintering (DMLS). The example nozzle 400 has a substantially cylindrical shape, as does each of its component nozzle inserts 404, 406, and 408, but this is not a requirement.

Nozzle 400 of FIG. 4 defines three channels for conveying melt.

A first, centrally disposed channel 424 defined by the innermost nozzle insert 404 provides a passage for conveying melted surface layer material, received from the first injection unit 104, axially towards nozzle tip 402. Channel 424 also accommodates an axially reciprocable valve stem 432. The channel 424 and valve stem 432 collectively define an annular passage through which surface layer material is flowable until the melt clears the end of valve stem 432 (when the valve stem 432 is in the fully retracted position of FIG. 4) and exits outlet 444 as a substantially cylindrical flow. Upon exiting outlet 444, the melt enters nozzle combination area 429 for combination with one or more other melt streams, as will be described. Channel 424 may be referred to as inner channel 424, and outlet 444 may accordingly be referred to as the inner outlet 444.

A second, substantially annular channel 426 is defined between the innermost nozzle insert 404 and the intermediary nozzle insert 406. The second channel 426 conveys melted internal layer material received from the second injection unit 106 axially towards an inwardly facing annular outlet 446. Upon exiting the annular outlet 446, the annular melt stream flows into nozzle combination area 429 for combination with one or more other melt streams. Channel 426 may be referred to as the intermediate channel 426, and outlet 446 may accordingly be referred to as the intermediate outlet 446.

A third, substantially annular channel 428 is defined between the intermediary nozzle insert 406 and the outermost nozzle insert 408. The third channel 428 conveys surface layer material received from the first injection unit 104 to inwardly facing annular outlet 448. Upon exiting outlet 448, the discharged melt enters nozzle combination area 429, where it may be combined with one or more other melt streams. Channel 428 may be referred to as the outer channel 428, and outlet 448 may accordingly be referred to as the outer outlet 448. In the present embodiment, the outer channel 428 is substantially concentric with each of the intermediate channel 426 and the inner channel 424.

It will be appreciated that, by virtue of the above-described nozzle structures, the inner, intermediate, and outer channels 424, 426, and 428 all supply or feed respective streams of molding material to the combination area 429, which may accordingly be referred to a "material combination area."

Valve stem 432 can be used to control the flow of molding material into the combination area 429 and thus the mold cavity associated with nozzle 400. The valve stem 432 is controlled by controller 108 by way of an actuator (not depicted) that reciprocates the valve stem 432 between at least a subset of four positions or stops.

The first valve stem position is the fully opened position depicted in FIG. 4, in which the distal end 433 of the valve stem is positioned at axial "Stop 3." In this position, the valve stem 432 does not impede the flow of molding material from any of the inner outlet 444, intermediate outlet 446, or outer outlet 448. This valve stem position is referred to herein as Position 3, with the number 3 representing the number of open (unblocked) nozzle outlets (i.e. outlets 444, 446, and 448).

The second position is a mostly open position in which the end 433 of valve stem 432 is advanced (downwardly in FIG. 4) to the axial position marked as "Stop 2." When the valve stem 432 is in this position, it blocks (closes) inner outlet 444 and thereby prevents surface layer material from flowing therefrom. Intermediate outlet 446 and outer outlet 448 remain open. This valve stem position is referred to herein as Position 2, with the number 2 representing the number of open nozzle outlets (i.e. outlets 446 and 448).

The third position is a mostly closed position in which the end 433 of valve stem 432 is advanced to the axial position marked as "Stop 1" in FIG. 4. When the valve stem 432 is in this position, it blocks both of inner outlet 444 and intermediate outlet 446 and thereby prevents surface layer material and internal layer material, respectively, from flowing therefrom. Outer outlet 448 remains unblocked, permitting surface layer material from injection unit 104 to flow into combination area 429. This valve stem position is referred to as Position 1, reflecting the single nozzle outlet (outlet 448) that is open in this position.

Finally, the fourth position is a fully closed position in which the end 433 of valve stem 432 is advanced to the axial position marked as "Stop 0" in FIG. 4 within gate area 430. When the valve stem 432 is in this position, it blocks each of the inner outlet 444, intermediate outlet 446, and outer outlet 448, thereby preventing molding material from flowing from any of those outlets. This valve stem position may be referred to as Position 0, with the number 0 reflecting the number of open nozzle outlets (i.e. none).

The clearance between the valve stem 432 and each of these outlets may for example be on the order of microns. The clearance may vary between embodiments based on, e.g., the viscosity of the melted molding materials in the respective channels 424, 426, and 428, the pressure of the melt within nozzle 400 immediately upstream of the valve stem 432, and other factors.

Figure 4A:
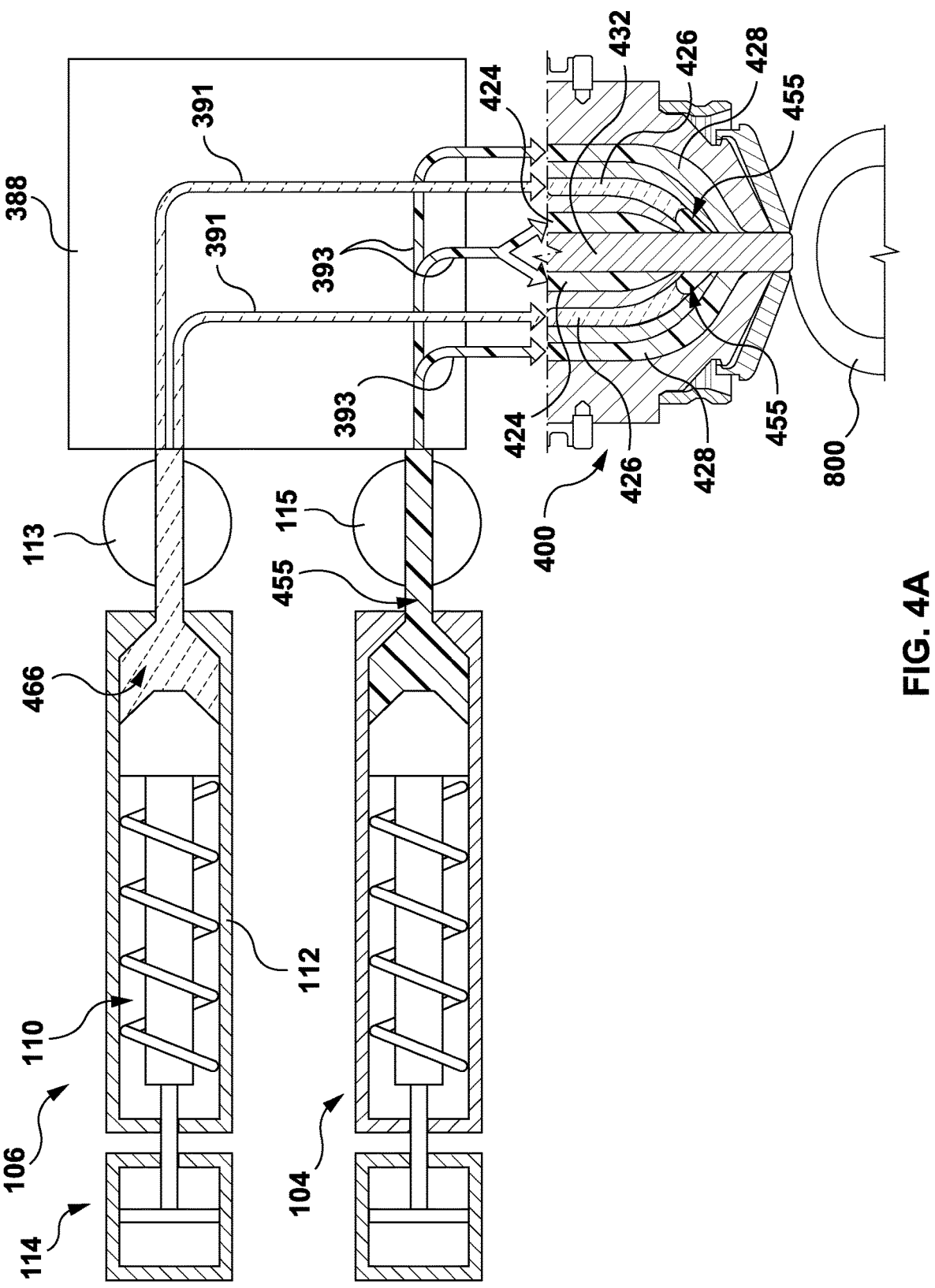
FIG. 4A schematically depicts a portion of the injection molding machine of FIG. 1 in greater detail.

FIG. 4A schematically depicts a portion of the injection molding machine 100 of FIG. 1 in greater detail. The depicted portion of machine 100 includes the internal layer material injection unit 106, the surface layer material injection unit 104, part of hot runner 388, part of a single coinjection nozzle 400, and part of an associated mold cavity 800 for forming a preform 200. FIG. 4A generally illustrates the manner in which surface layer material 455 and internal layer material 466 are supplied to coinjection nozzle 400.

Injection unit 106 of FIG. 4A comprises a helical reciprocating screw 110 housed in an extruder barrel 112. The barrel 112 is selectively heatable, e.g. by a band heater (not expressly depicted). The barrel also has an inlet (not expressly depicted) for receiving internal layer material 466, e.g. in pellet form. The screw 110 is rotatable within the heated barrel 112 to mix and plasticize internal layer material. An outlet nozzle valve 113 (open in FIG. 4A) can be selectively opened or closed by controller 108 (FIG. 1) to selectively establish fluid communication between the internal layer material injection unit 106 and passageways 391 within the hot runner 388 for conveying internal layer material 466 to nozzle 400.

The injection unit 106 of FIG. 4A also comprises, or is otherwise associated with, an injection actuator 114. The injection actuator 114 (or simply "actuator 114") is configured to reciprocate the screw 110 longitudinally within the barrel 112 to effect injection and recovery phases of operation of internal layer material injection unit 106. The depicted actuator 114 is controlled by controller 108.

Surface layer material injection unit 104 has a similar structure to that of internal layer material injection unit 106. An outlet nozzle valve 115 (open in FIG. 4A) is controllable by controller 108 (FIG. 1) to selectively establish fluid communication between the surface layer material injection unit 104 and passageways 393 within the hot runner 388 for conveying surface layer material 455 to the nozzle 400.

FIG. 4A schematically illustrates flow paths for molding material from injection units 104 and 106 to nozzle 400 via hot runner 388. As illustrated, surface layer material injection unit 104 supplies surface layer material 455 to hot runner passageways 393. In turn, passageways 393 supply the inner and outer channels 424 and 428 of nozzle 400. As also illustrated, internal layer material injection unit 106 supplies internal layer material 466 to hot runner passageways 391, which in turn supply intermediate channel 426 of nozzle 400. The arrowheads at the downstream-most ends of passageways 391, 393 in FIG. 4A schematically depict the primary direction of flow of the respective conveyed materials. It will be appreciated that other nozzles (not depicted) comprising injection molding machine 100 are supplied with melt in a similar way.

Figure 5:
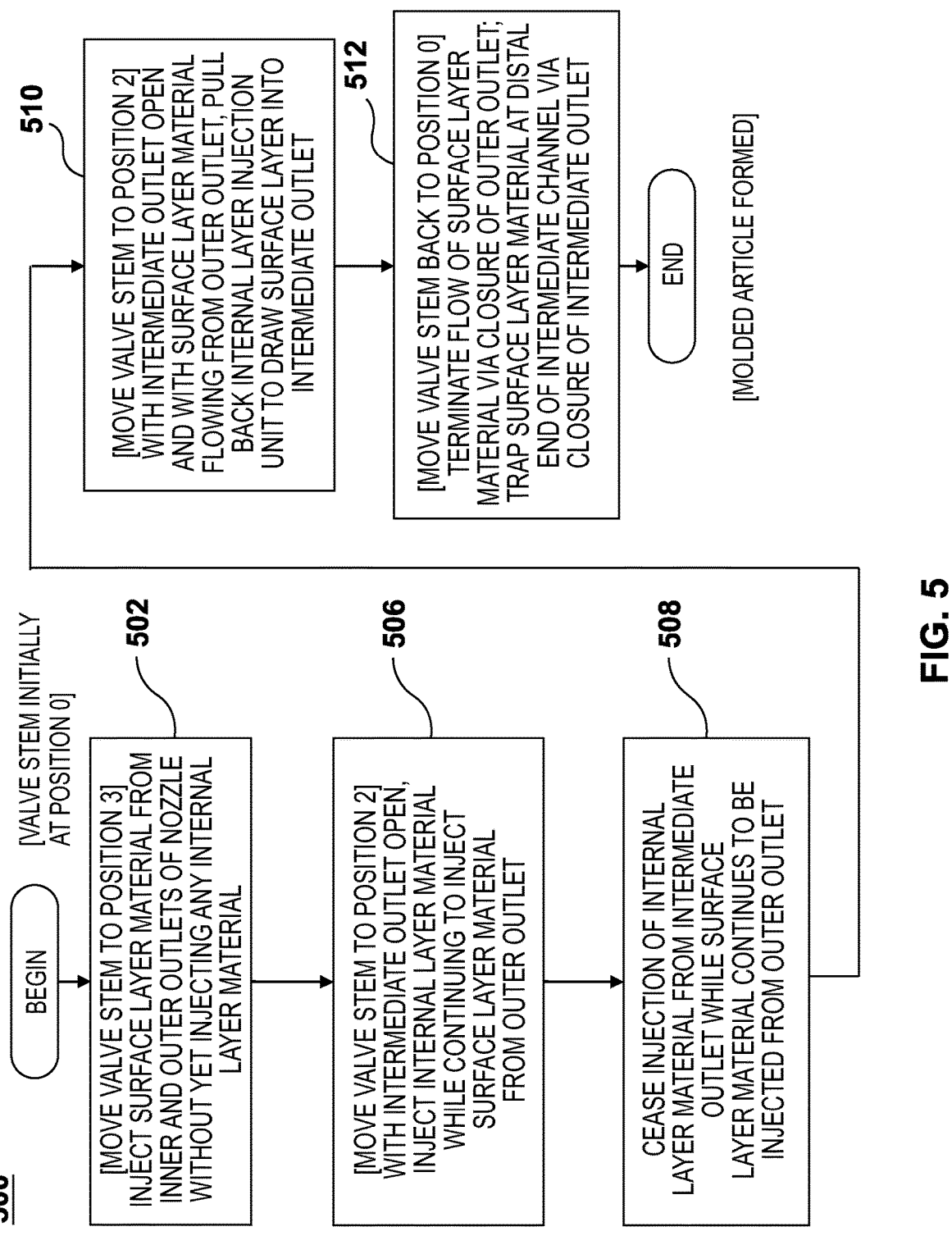
FIG. 5 is a flowchart of operation of the molding machine of FIG. 1 for forming the preform of FIGS. 2 and 3 over the course of a single molding cycle according to a conventional process.

Operation 500 of the molding machine 100 for coinjection of a conventional multilayer article is depicted in FIG. 5 in the form of a flowchart. Operation 500 will be described in conjunction with FIGS. 6-10, which schematically depict, in longitudinal cross section, a portion of the nozzle 400 of FIG. 4 and at least part of an associated mold cavity 800 at various stages of formation of a preform 200 during a single injection molding cycle.

Figure 6:
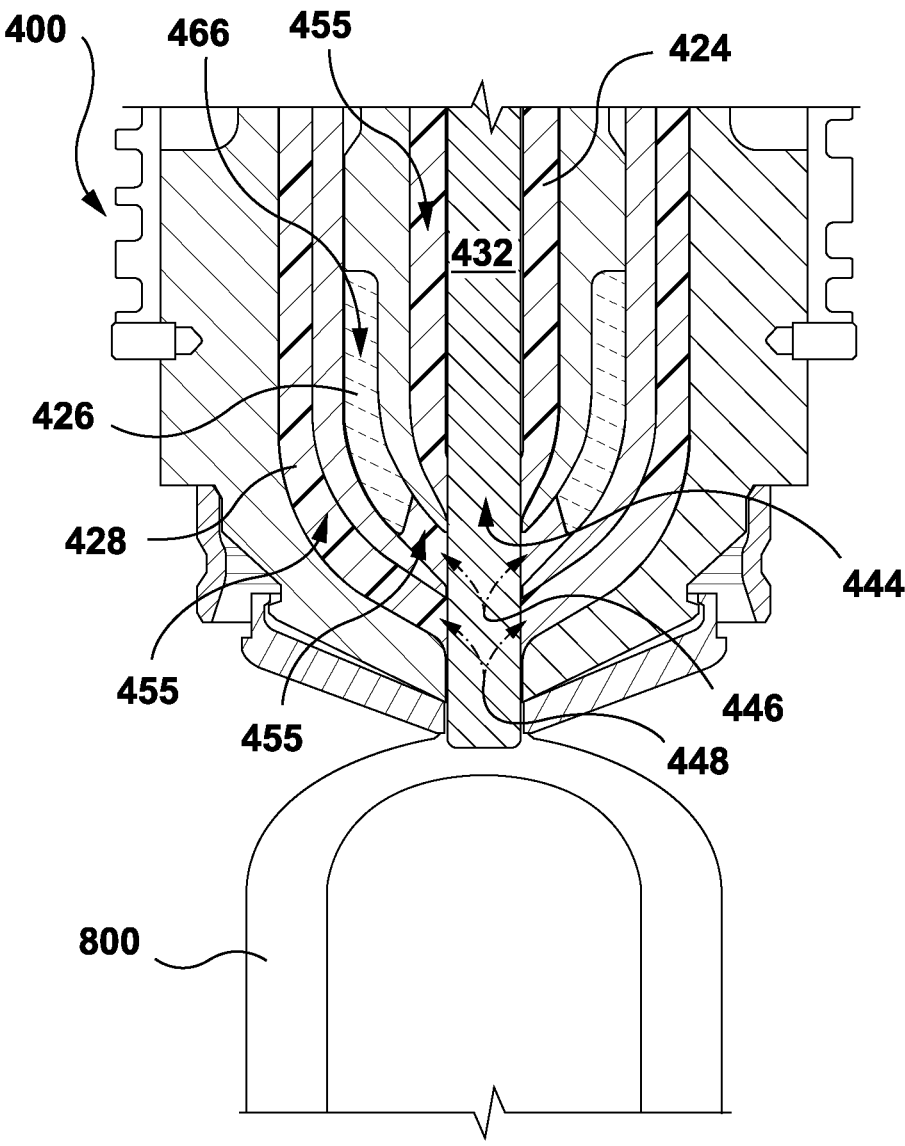
FIGS. 6, 7, 8, 9, and 10 are schematic diagrams of the nozzle of FIG. 4 and at least part of an associated mold cavity in longitudinal cross section at various stages of the operation of FIG. 5.

Referring to FIG. 6, at the beginning of an injection molding cycle, the valve stem 432 of nozzle 400 is in Position 0, i.e. the fully closed position. In that position, the valve stem 432 blocks (i.e. closes) the inner outlet 444, intermediate outlet 446, and outer outlet 448, thereby preventing any surface layer material 455 or any internal layer material 466 from flowing. The mold cavity 800 (shown only in part in FIG. 6) associated with the nozzle 400, which defines a negative space in the shape of preform 200, is initially empty, with any preform from a previous molding cycle having been ejected.

In the embodiment illustrated in FIG. 6, it can be seen that the distal end of intermediate channel 426, immediately upstream of intermediate outlet 446, initially contains a small amount of surface layer material 455. This is despite the fact that the intermediate channel 426 is intended to convey internal layer material 466 from injection unit 106 towards mold cavity 800. The manner in which the distal end of channel 426 is filled with surface layer material 455 at the end of the previous molding cycle and the rationale for doing so are described below.

Referring to FIG. 5, in a first operation 502, the valve stem 432 is moved from Position 0 (the fully closed position) to Position 3 (the fully open position), and injection of the surface layer material 455 by injection unit 104 is commenced with valve 115 in the open position (see FIG. 4A). The surface layer material 455 flows through passageways 393 of hot runner 388 into inner and outer channels 424 and 428 of nozzle 400. Notably, the other injection unit 106 is not yet activated in operation 502, i.e. no internal layer material is yet made to flow into intermediate channel 426. The initial flow of molding material is limited to only surface layer material 455. This is so that the neck finish area 206 of the preform 200 at the distal end of the mold cavity will be comprised primarily of surface layer material 455.

Figure 7:
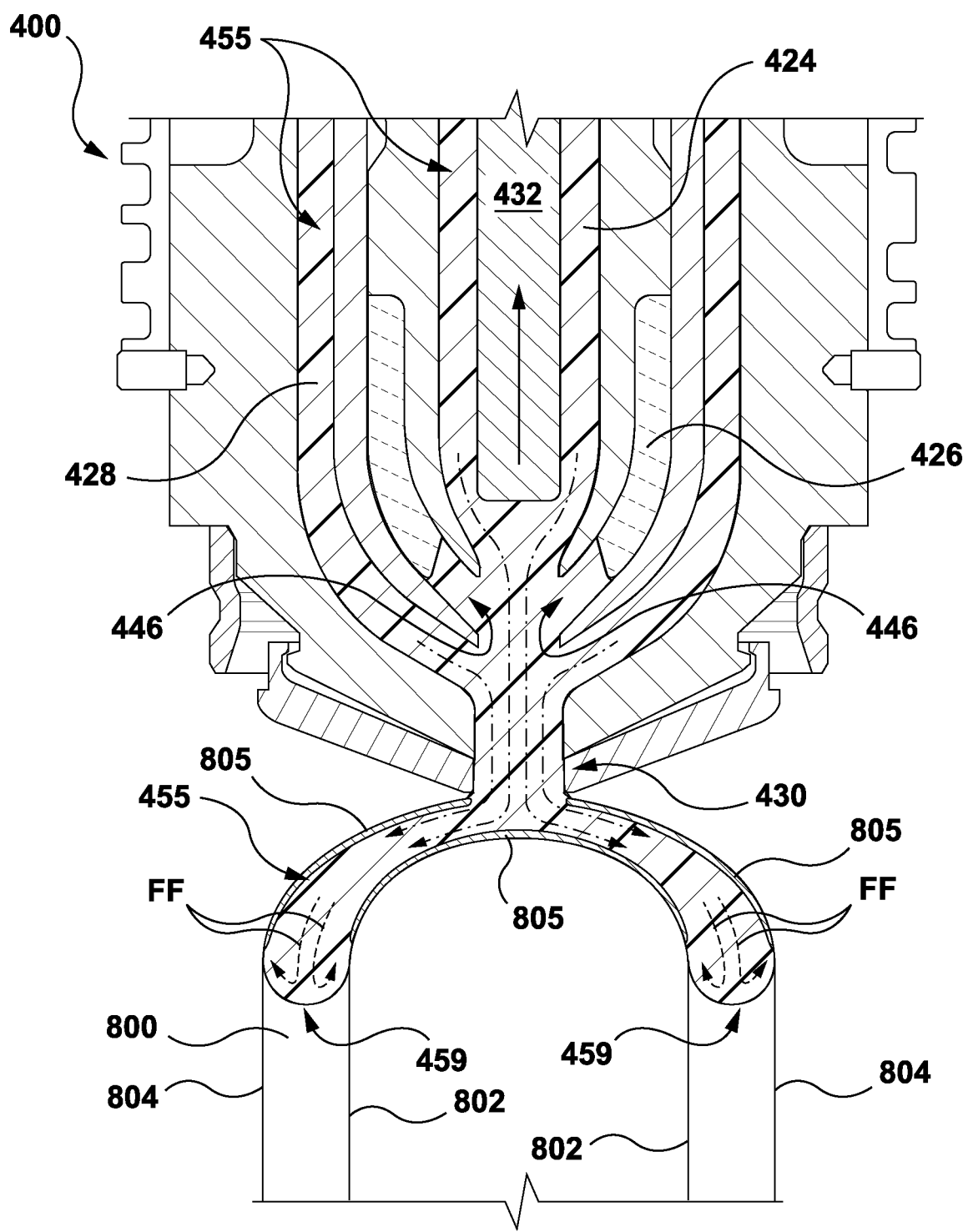

The state of the nozzle 400 and mold cavity 800 during operation 502 of FIG. 5 are depicted in FIG. 7. As illustrated, surface layer material 455 from both of the inner and outer channels 424 and 428 flows into mold cavity 800 via gate area 430. It will be appreciated that the stream of surface layer material 455 from the inner channel 424 flowing past intermediate outlet 446 may have a tendency to entrain or "drag" some of the material from outlet 446 along with it. To the extent that this does occur, the dragged material will also be surface layer material 455, in view of the small amount of surface layer material 455 occupying the distal end of channel 426. This is intended to limit contamination of the neck finish 206 portion of the preform 200 with internal layer material 466.

As the melt front 459 (leading edge) of the flowing surface layer material 455 advances within the mold cavity 800, the fastest-flowing central part of the stream exhibits "fountain flow," i.e. tends to spread out laterally towards the mold cavity walls on both the core and cavity sides of the mold (see dashed arrows FF, FIG. 7). Upon contacting either the cavity surface 802 or the core surface 804 of the mold cavity 800, the fountaining surface layer material 455 quickly cools and adheres thereto. This occurs because the cavity and core surfaces 802 and 804 of the mold cavity 800 are cold in comparison to the surface layer material 455. In the result, a hardened "skin" layer 805 of surface layer material 455 quickly forms on the core and cavity sides of the mold (see FIG. 7).

Figure 8:
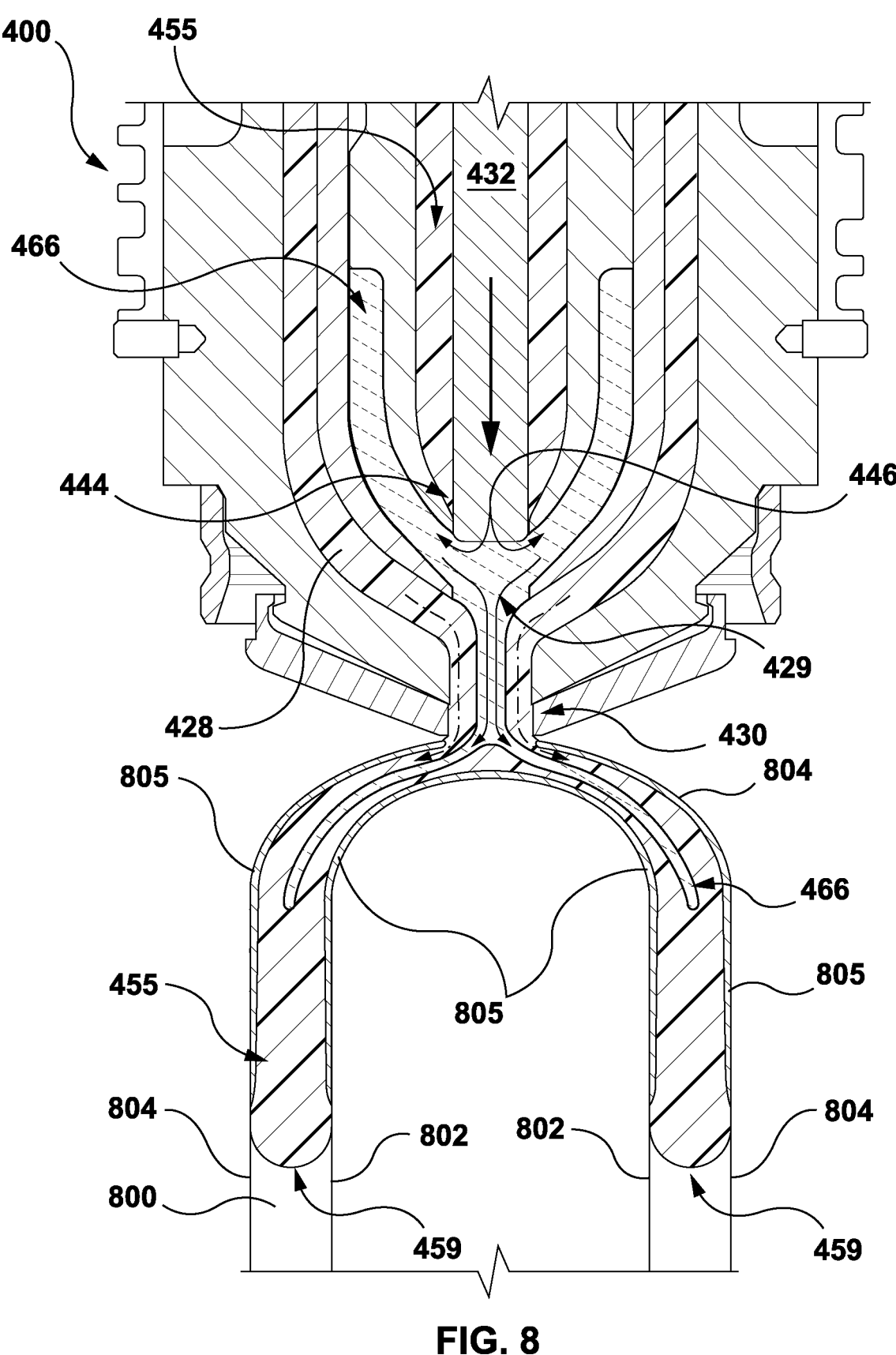
Figure 9:
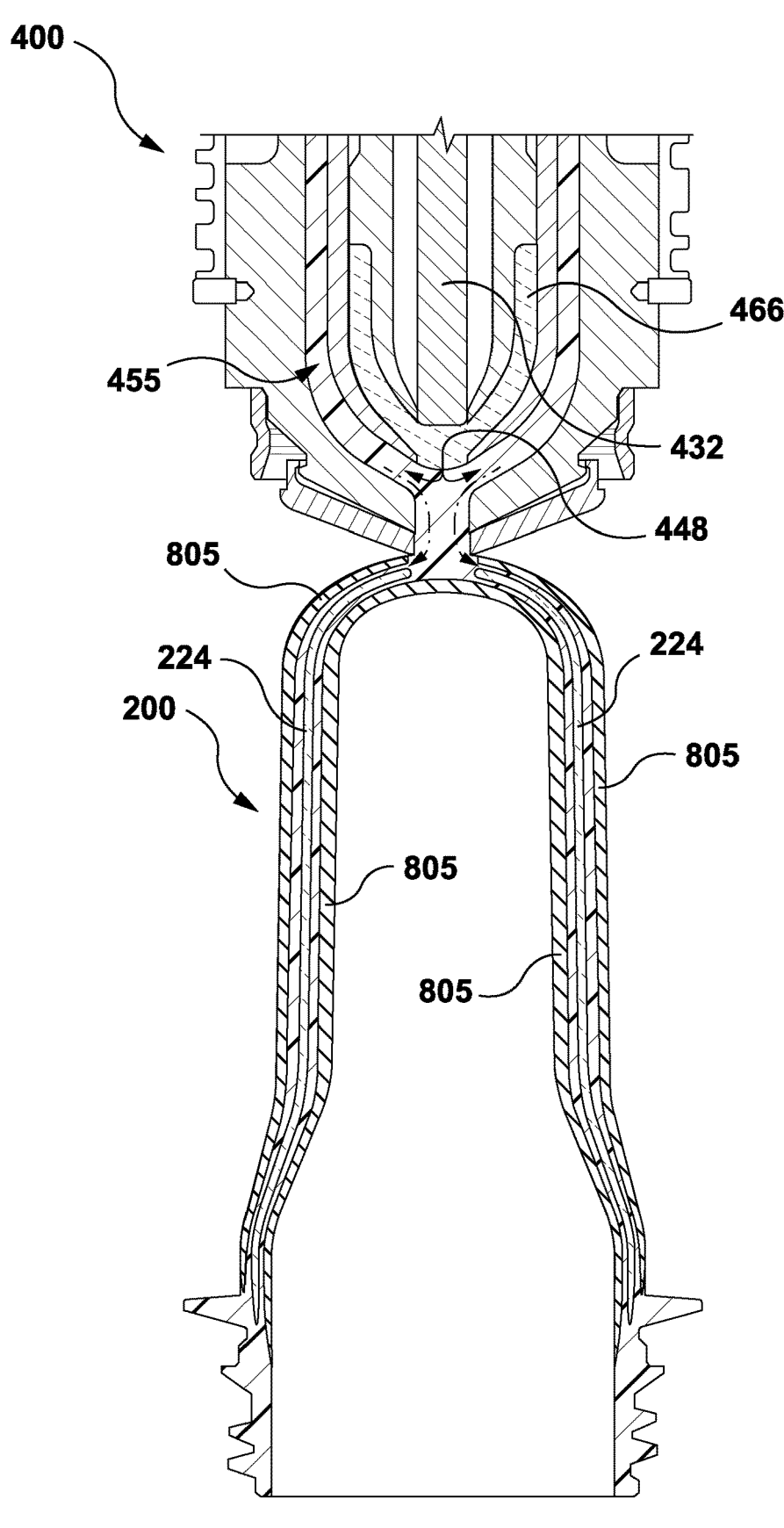
Figure 10:
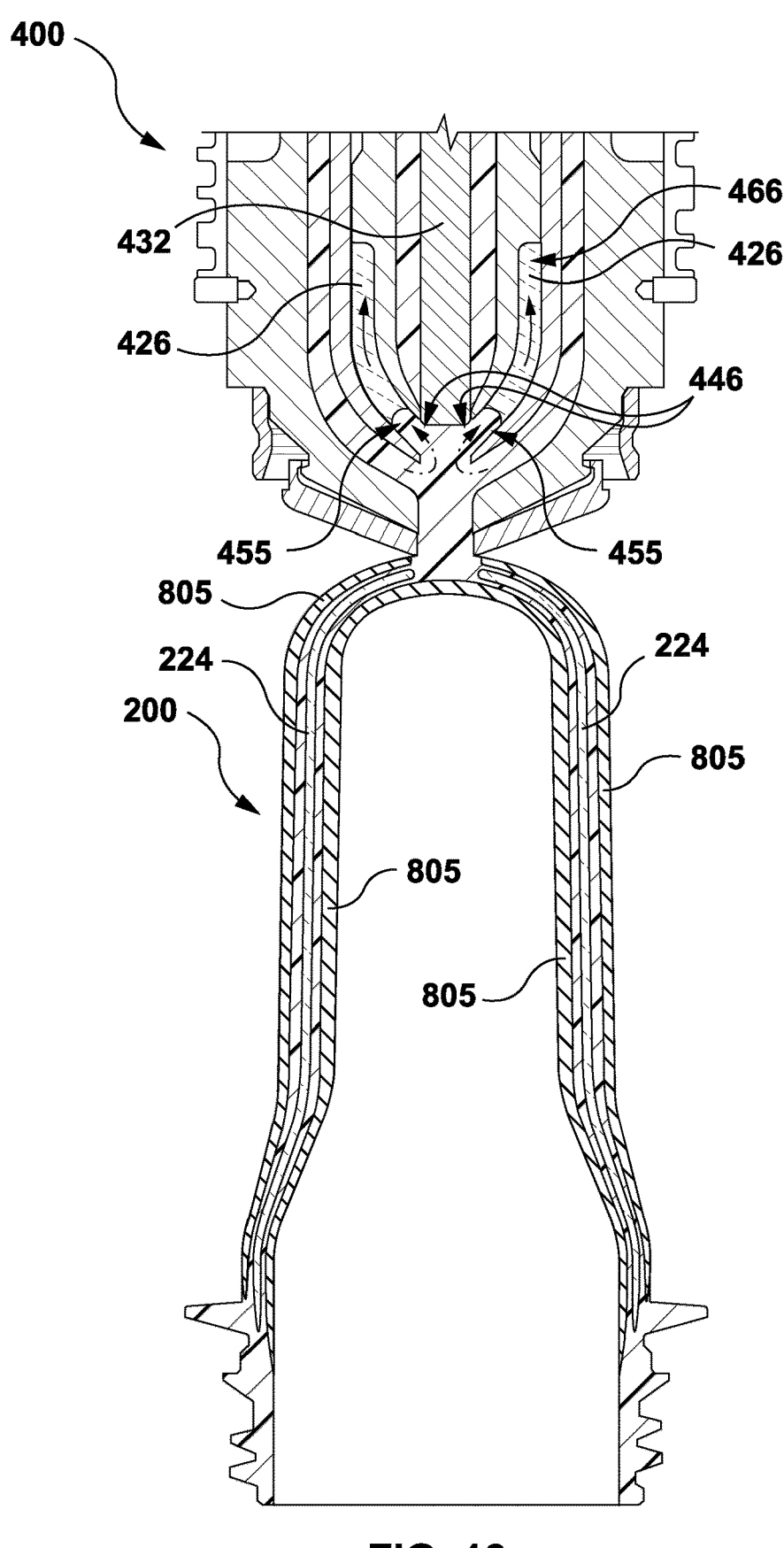

In a subsequent operation 506 (FIG. 5), controller 108 causes valve stem 432 to move to Position 2, as shown in FIG. 8. In addition, controller 108 triggers injection by injection unit 106 of internal layer material 466 into mold cavity 800 from the intermediate outlet 446 of nozzle 400, i.e. initiates injection of internal layer segment 224 (FIG. 3).

As shown in FIG. 8, the internal layer material 466 entering the mold cavity 800 is sandwiched by, and flows along with, surface layer material 455, which continues to be injected from outer channel 428 to flow into the mold cavity 800. At the same time, the molten surface layer material 455 flowing closest to the already hardened skin 805 itself cools and hardens from the outside in (see FIG. 8), thereby further thickening the hardened skin 805 of surface layer material 455.

The inventor believes that the speed of the outside-in hardening of surface layer material 455 on both the core and cavity sides of the mold cavity 800 at this stage is at least partly responsible for limiting the amount of internal layer material 466 that can be injected into a conventional multilayer preform 200. The rapid hardening is believed to restrict or narrow the open space within mold cavity 800 through which additional internal layer material 466 can flow. In one example implementation, the inventor found that the proportion of internal layer material 466 within fully formed multilayer preforms made in this way did not exceed 40% by volume.

In a subsequent operation 508 (FIG. 5), internal layer material injection unit 106 is suitably controlled so as to terminate injection of internal layer material 466. The formation of the internal layer segment 224 is accordingly completed. Surface layer material 455 continues to be injected from outer outlet 448 (see FIG. 9).

With the intermediate outlet 446 open and with the surface layer material injection unit 104 in a "hold phase" in which surface layer material 455 is still under positive pressure and flowing (albeit slowly) from outer outlet 448, the controller 108 causes the internal layer material injection unit 106 to pull back slightly (operation 510, FIG. 5). The pullback has the effect of reducing a pressure of the internal layer material 466 within the extruder barrel 112 and the intermediate channel 426. The reduced pressure in turn allows a small amount of pressurized surface layer material 455 to flow into the distal end of intermediate channel 426, as shown in the longitudinal cross-section of FIG. 10. It will be appreciated that the direction of this flow is upstream, i.e. opposite to the normal direction of flow of intermediate layer material 466 through channel 426 during the injection phase (operation 506 of FIG. 5, described above). For this reason, the filling of the distal end the channel 426 with surface layer material 455 in operation 510 may be referred to as "backfilling." Backfilling is done for the reasons mentioned hereinabove.

Finally, in operation 512 (FIG. 5), the controller 108 causes valve stem 432 to return to its original, fully closed position, i.e. Position 0. This closure has the effect of trapping a small amount of surface layer material in the distal end of the intermediate channel 426, in preparation for the next molding cycle. In the result, the state of the nozzle 400 at the conclusion of operation 512 will be the same as its initial state of FIG. 6.

It will be appreciated that alternative embodiments of the injection molding machine 100 might implement operation 500 slightly differently. For example, in operation 506, the stem 432 could be kept in position 3 rather than moved to position 2, with surface layer material 455 being injected from both the inner and outer outlets 444, 448 of the nozzle 400, rather than just the outer outlet 448. In operation 510, the valve stem could be position 3 rather than position 2, so that surface material 455 for backfilling is supplied from not just the outer outlet 448 but also the inner outlet 444. Aspects of operation 500 may also differ somewhat from what is shown in FIG. 5 based on the design of the coinjection nozzle of the molding machine. For example, in some embodiments, the coinjection nozzle has an annulus of clearance between the valve stem and each of the intermediate outlet and the outer outlet. Such embodiments can still achieve backfilling of the distal end of their intermediate channels, even if their valve stems cannot mechanically block the intermediate or outer outlets or mechanically trap surface layer material 455 at the distal end of the intermediate channel as described in operation 512.

Figure 11A:
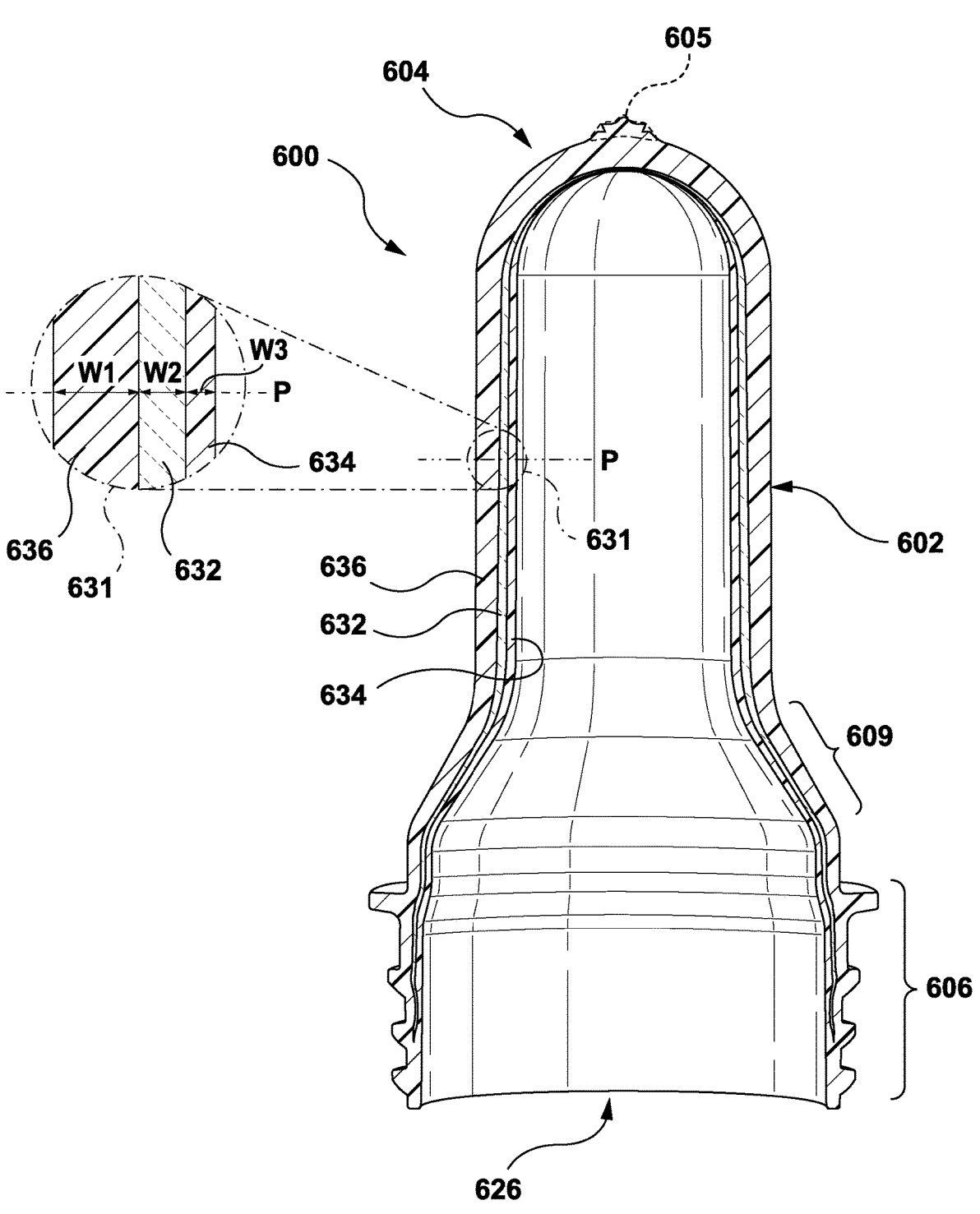
FIG. 11A is a longitudinal cross section of a sample multilayer preform made according to the flowchart of operation of FIG. 5.

FIG. 11A is a longitudinal cross section of a sample multilayer container preform 600 made using a machine similar to machine 100 using PET for both the surface layer material 455 and the internal layer material 466. Distinct colorants were added to materials 455, 466 respectively to facilitate visual inspection of the distribution of those materials in the resultant preform.

In many respects, preform 600 is similar to preform 200 of FIGS. 2 and 3. For example, preform 600 has an elongate tubular body 602, a domed closed base 604, a neck finish 606 at an open end 226 of the preform. The body portion 602 has a transition area 609. Preform 600 comprises an internal layer 632 of internal layer material 466 sandwiched between inner and outer layers 634, 636 of surface layer material 455. The internal layer material 466 is fully encapsulated by the surface layer material 455. The thicknesses of the layers 632,

634, and 636 vary throughout the preform 600, with the internal layer 632 being thickest in the body portion 602 of the preform 600.

FIG. 11A shows an enlarged view 631 of the preform wall in the body portion 602 of the preform 600. Reference numerals W1, W2, and W3 denote the thicknesses of the outer layer 636, internal layer 632, and inner layer 634 respectively measured along a plane P orthogonal to the preform wall. In this sample preform 600, the relationship between these thicknesses is W1>W2>W3. The thickness W2 of internal layer 632 in body portion 602 is less than approximately 40% of the overall thickness of the preform wall and less than 50% of the sum of the thicknesses W1 and W3 of the inner and outer layers 634, 636.

Unlike the internal segment 224 of preform 200 (FIG. 3), the internal layer 632 of preform 600 extends into and through the entirety of domed base area 604. The thickness of the internal layer 632 tapers to less than 10% of the overall thickness of the base 604 in the base area 604—even less if the thickness of the gate nub 605 is taken into consideration.

Notably, the proportion of internal layer material 466 within preform 600 by volume is about 20%. It will be appreciated that this proportion may depend in part upon the shot size of the internal layer material 466 (i.e. the amount of internal layer material 466 injected during the molding of a single preform) and that an increased shot size could create a proportion of up to about 40% of internal layer material 466.

Figure 11B:
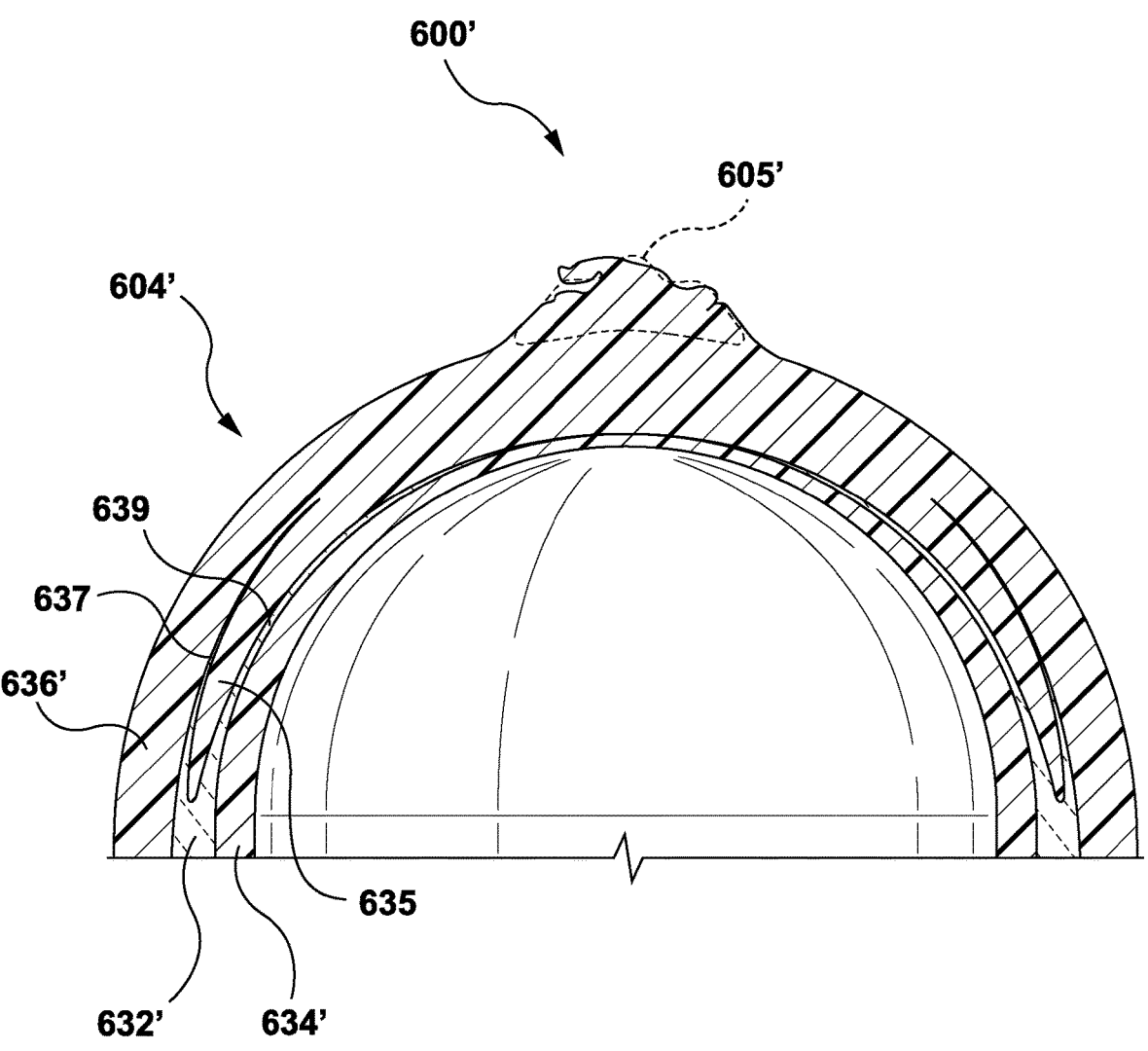
FIG. 11B is a longitudinal cross section of a base area of another sample multilayer preform made according to the flowchart of operation of FIG. 5.

FIG. 11B is a longitudinal cross section of a base portion of another preform 600' made using a machine similar to machine 100, again using PET for both the surface layer material 455 and the internal layer material 466. Preform 600' is in many respects similar to preform 600 of FIG. 11A. For example, preform 600' has an internal layer 632' of internal layer material 466 sandwiched between inner and outer layers 634', 636' of surface layer material 455. However, in the base area 604' of preform 600', a tongue 635 of surface layer material 455 extends from the direction of gate nub 605' towards body 602' into the trailing end of middle layer 632', effectively splitting layer 632' apart into two tapered fingers 637, 639. The tongue 635 may be result of a hold or packing phase of injection molding operation, in which the surface layer material 455 injected at the end of an injection molding cycle pushes down into the mold cavity and encroaches into middle layer 632'.

The proportion of internal layer material 466 by volume within preform 600' is about the same as for preform 600, i.e. about 20%.

The inventor has considered various approaches for varying the operation 500 of FIG. 5 to increase the proportion of internal layer material in multilayer preforms but has found many approaches to be disadvantageous in various respects.

One approach that was considered was increasing the temperature of the mold cavity walls 802, 804 relative to the temperature of the injected surface layer material 455. The rationale for this approach is to slow the rate of outside-in hardening of surface layer material 455, to provide more time and room for internal layer material 466 to be injected into the mold cavity 800 during the injection molding cycle. However, it was considered that the corresponding increase in in-mold cooling time would unacceptably diminish molding machine throughput.

Another approach that was considered was reducing the amount of surface layer material 455 injected during the stages depicted in FIGS. 7 and 8, with a view to leaving "more room" for an increased proportion of internal layer material 466 in the molded article. However, this approach was considered to unacceptably increase the risk of defective preforms. In particular, when the amount of injected surface layer material 455 is reduced, there is a greater risk that the material may harden prematurely, allowing internal layer material 466 to "catch up" to the melt front 459. In that event, internal layer material 466 at the melt front may spread out laterally from the melt front and come into direct contact with the core or cavity sides of the mold cavity. This would deposit internal layer material 466 on an exterior surface of the molded article, rendering the article defective for at least some applications, e.g. for the reasons mentioned hereinabove.

To avoid these problems, the inventor has developed a new approach that significantly increases the proportion of internal layer material within the multilayer preform. The new approach is unconventional because it uses a known coinjection nozzle, such as nozzle 400 of FIG. 4, in a manner that is wholly different from the manner in which the nozzle was designed to be used, e.g. differently from the manner in which nozzle 400 is used in operation 500 of FIG. 5. In particular, the new approach reverses the roles of the intermediate channel and the inner and outer channels (and their respective outlets) of the coinjection nozzle 400, as follows. The intermediate channel 426 of the nozzle conveys surface layer material (rather than internal layer material) into the mold cavity, and the inner and outer channels 424, 428 of the nozzle convey internal layer material (rather than surface layer material) into the mold cavity.

The new approach is counterintuitive precisely because the placement of the intermediate channel outlet 446 between the inner and outer channel outlets 444, 448 of the nozzle was specifically designed to facilitate encapsulation of internal layer material flowing from the former by surface layer material flowing from the latter on either side. In essence, the new approach uses these outlets in the opposite way from that for which they were designed. As such, the new approach may be considered not only counterintuitive, but as a paradigm shift from conventional coinjection molding techniques.

To achieve this result, the new injection molding machine uses a hot runner having a different melt distribution network from that of a conventional injection molding machine, such as machine 100 of FIG. 1. Moreover, the controller of the new injection molding machine effects a different control sequence from what is conventionally used to mold multilayer preforms, e.g. as described above in relation to FIG. 5. Other components of the new injection molding machine, such as injection units and nozzles, may be similar or identical to those of convention injection molding machines, albeit controlled differently. The re-use of these other components may advantageously minimize the cost of retrofitting an existing injection molding machine installation to implement the new approach.

Figure 12:
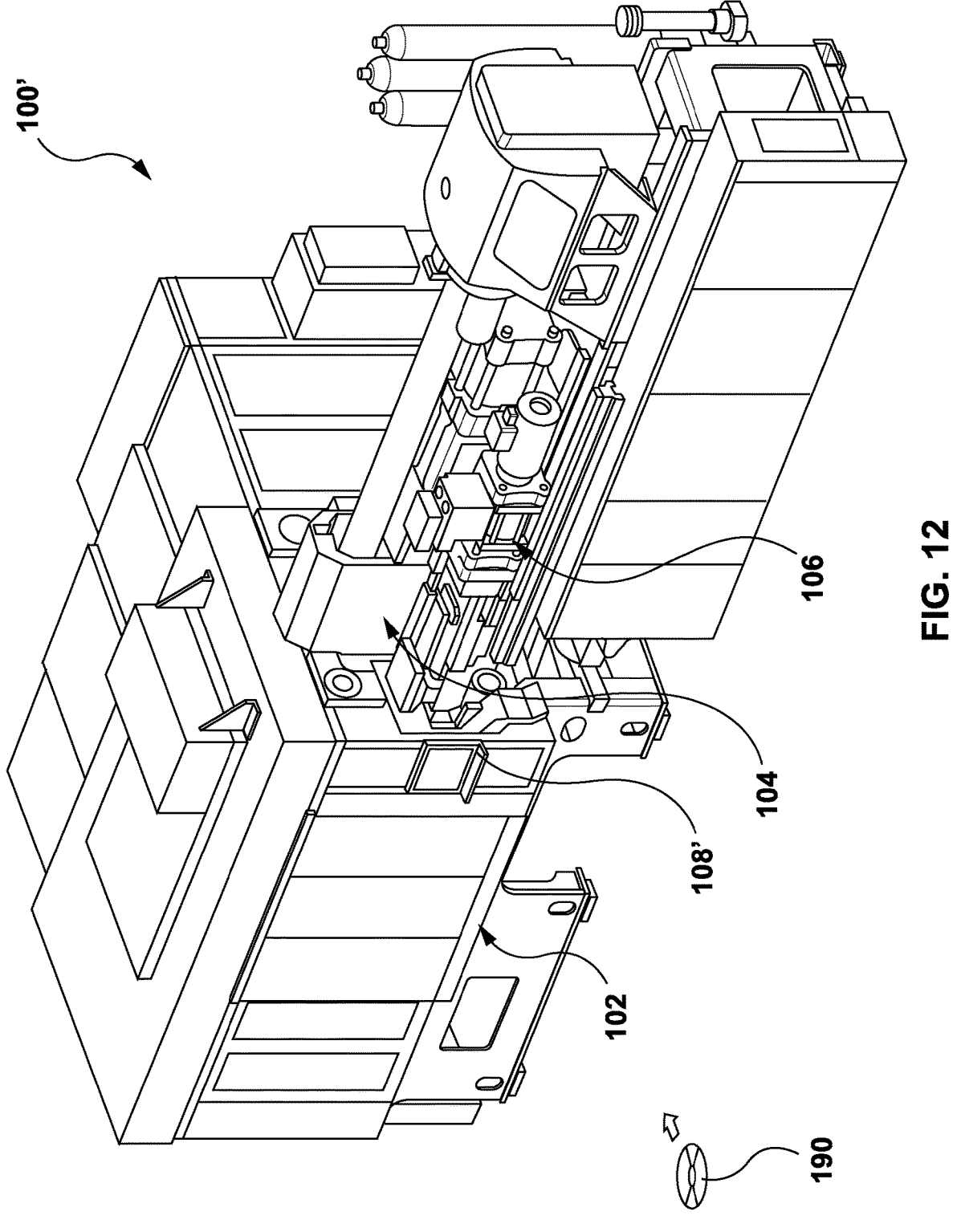
FIG. 12 is a perspective view of an injection molding machine for injection molded multilayer articles having a high proportion of internal layer material.

FIG. 12 is a perspective view of an injection molding machine 100' for injection molded multilayer articles having a high proportion of internal layer material. As noted above, some components of molding machine 100' may be similar or identical to their counterparts in the above-described molding machine 100. These include the enclosure 102, certain housed subcomponents—e.g. the clamp unit, the fixed platen, the movable platen, and the mold mounted therebetween comprising mold cavity 800, none of which are expressly depicted in FIG. 12—the surface layer material injection unit 104, the internal layer material injection unit 106, and coinjection nozzle 400. Each of these components of injection molding machine 100' is referenced using the same reference numerals as were used above for machine 100, to reflect the fact that the components may be identical to their counterparts of machine 100, albeit possibly controlled differently.

Other components of injection molding machine 100' of FIG. 12 are different from their counterparts of injection molding machine 100 of FIG. 1. These components include controller 108' and hot runner 388' (the latter not being illustrated in FIG. 12 but being shown in FIG. 13, described below). Controller 108' differs from controller 108 at least in terms of the operational steps triggered during an injection molding cycle. The operational steps may be governed by program code stored on a tangible medium 190, which code is read and executed by the controller 108' to control machine operation. The hot runner 388' differs structurally from hot runner 388 in terms of the "plumbing" that it provides between the injection units 104, 106 and the nozzle 400, as will be described. The controller 108' and the hot runner 388' are denoted herein using a variant of the reference numerals that were used to identify their counterparts in molding machine 100, namely the same reference numeral but with an appended apostrophe ("prime") (') symbol.

Figure 13:
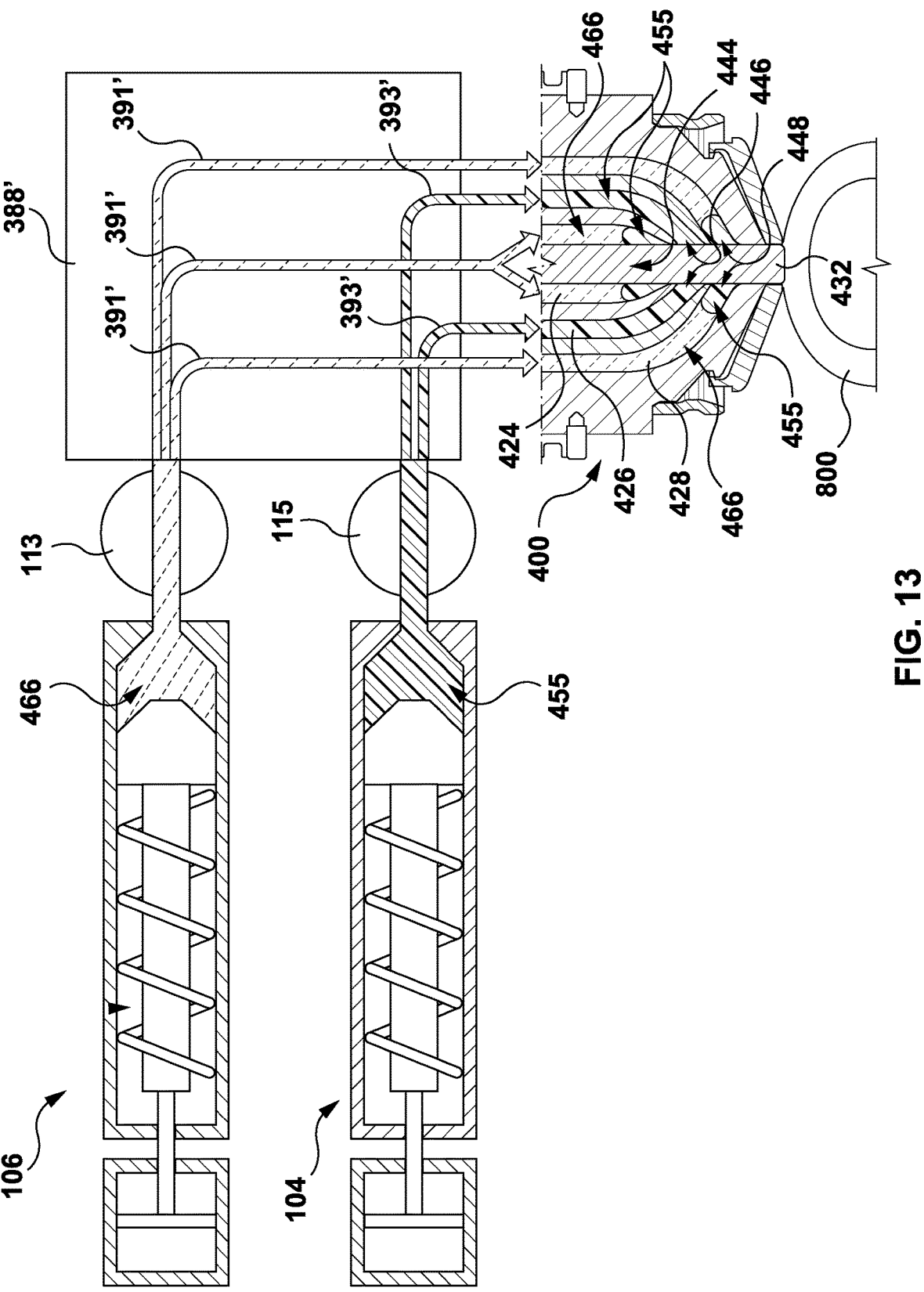
FIG. 13 schematically depicts a portion of the injection molding machine of FIG. 12 in greater detail.

FIG. 13 schematically depicts a portion of the injection molding machine 100' of FIG. 12 in greater detail. FIG. 13 adopts the same conventions as FIG. 4A, discussed above. The depicted portion of machine 100' of FIG. 13 includes the internal layer material injection unit 106, the surface layer material injection unit 104, part of a single coinjection nozzle 400, and part of an associated mold cavity 800 for forming a multilayer preform. These elements may be structurally identical to their counterparts of FIG. 4A.

FIG. 13 also depicts part of hot runner 388' comprising passageways 391' and 393'. It will be appreciated that the roles of passageways 391' and 393' are essentially reversed in relation to the roles of passageways 391 and 393, respectively, of the hot runner 388 of FIG. 4A. In particular, passageways 391' are configured to convey internal layer material 466 to the inner channel 424 and outer channel 428 of the nozzle 400, and passageways 393' are configured to convey surface layer material 455 to the intermediate channel 426 of nozzle 400. This is in contrast to hot runner 388, in which passageways 391 are configured internal layer material 466 to the intermediate channel 426, and passageways 393 are configured to convey surface layer material 455 to the inner and outer channels 424, 428, as earlier described.

FIG. 14 depicts, in the form of a flowchart, operation 1400 for molding a multilayer article with a high proportion of internal layer material using machine 100'. Operation 1400 will be described below in conjunction with FIGS. 15-17, which schematically depict, in longitudinal cross section, a portion of the nozzle 400 and an associated mold cavity 800 of machine 100' at various stages of formation of a preform during a single injection molding cycle.

In operation 1402 of FIG. 14, a coinjection nozzle 400 having an inner outlet 444, and outer outlet 448, and an intermediate outlet 446 between the inner and outer outlets, is provided. It will be appreciated that nozzle 400 is the same nozzle as is shown in FIG. 4, above. FIG. 13 shows the status of nozzle 400 at the beginning of an injection molding cycle.

As illustrated in FIG. 13, the valve stem 432 of nozzle 400 is in Position 0, i.e. the fully closed position. In that position, the valve stem 432 blocks the inner outlet 444, intermediate outlet 446, and outer outlet 448, thereby preventing any surface layer material 455 or any internal layer material 466 from flowing. The mold cavity 800 (shown only in part in FIG. 13) associated with the nozzle 400, which defines a negative space in the shape of the preform, is initially empty, with any preform from a previous molding cycle having been ejected.

In the embodiment illustrated in FIG. 13, it can be seen that the distal end of inner channel 424, immediately upstream of inner outlet 444, contains a small amount of surface layer material 455. Similarly, the distal end of outer channel 428, immediately upstream of outer outlet 448, contains a small amount of surface layer material 455. This is despite the fact that the inner and outer channels 424, 428 are each intended to convey internal layer material 466 from injection unit 106 into mold cavity 800. The manner in which the distal ends of these channels 424, 428 are back-filled with surface layer material 455 at the end of the previous molding cycle and the rationale for doing so are described below.

In operation 1404 (FIG. 14), injection of a stream 756 of surface layer material 455 into mold cavity 800 is com-menced. In this embodiment, the controller 108' effects operation 1404 by causing the valve stem 432 of nozzle 400 to move from Position 0 (the fully closed position) to Position 3 (the fully open position) and triggering injection of the surface layer material 455 by injection unit 104. The resultant flow of surface layer material 455 is conveyed through passageways 393' of hot runner 388' into interme-diate channel 426 of nozzle 400 and into the mold cavity 800 from intermediate outlet 446 (see FIG. 13). Notably, the other injection unit 106 is not yet activated in operation 1404, i.e. no internal layer material 466 flows from the inner and outer outlets 444, 448. The initial flow of molding material within mold cavity 800 is accordingly limited to only surface layer material 455.

Figure 15:
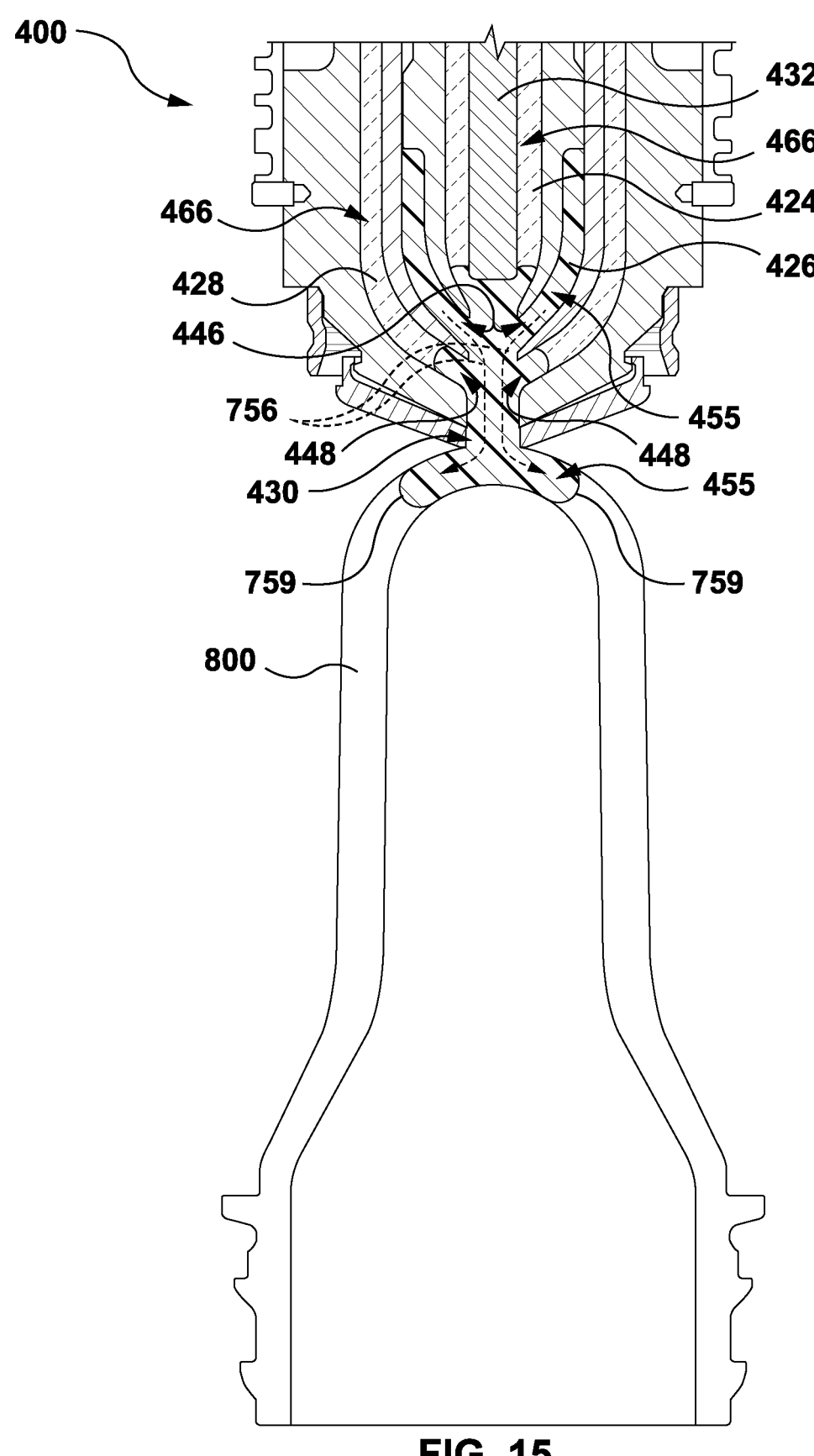
FIGS. 15, 16, and 17 are schematic diagrams of the nozzle of FIG. 4 and at least part of an associated mold cavity in longitudinal cross section at various stages of the operation of FIG. 14.

The state of the nozzle 400 and mold cavity 800 during operation 1404 of FIG. 14 is depicted in FIG. 15. It will be appreciated that a stream 756 of surface layer material 455 flowing out of the intermediate outlet 446 flows past the outer outlet 448 of nozzle 400. To the extent that this flowing surface layer material 455 entrains or "drags" some of the material from outlet 448 along with it, the dragged material will also be surface layer material 455. This is in view of the small amount of surface layer material 455 with which the distal end of channel 428 was previously backfilled. Accord-ingly, the material flowing into mold cavity 800 via gate area 430 to form a melt front 759 will be comprised of surface layer material 455 with little or no internal layer material 466. As such, the outermost skin of the preform, which is formed by the melt front 759 (due to the fountain flow effect described earlier), will also contain little or no internal layer material 466. Thus, the backfilling of the distal end of outer channel 428 with surface layer material 455 tends to reduce a likelihood of exposed internal layer material on a surface of the multilayer molded article, which may be considered to constitute a defect for at least some applications.

Figure 16:
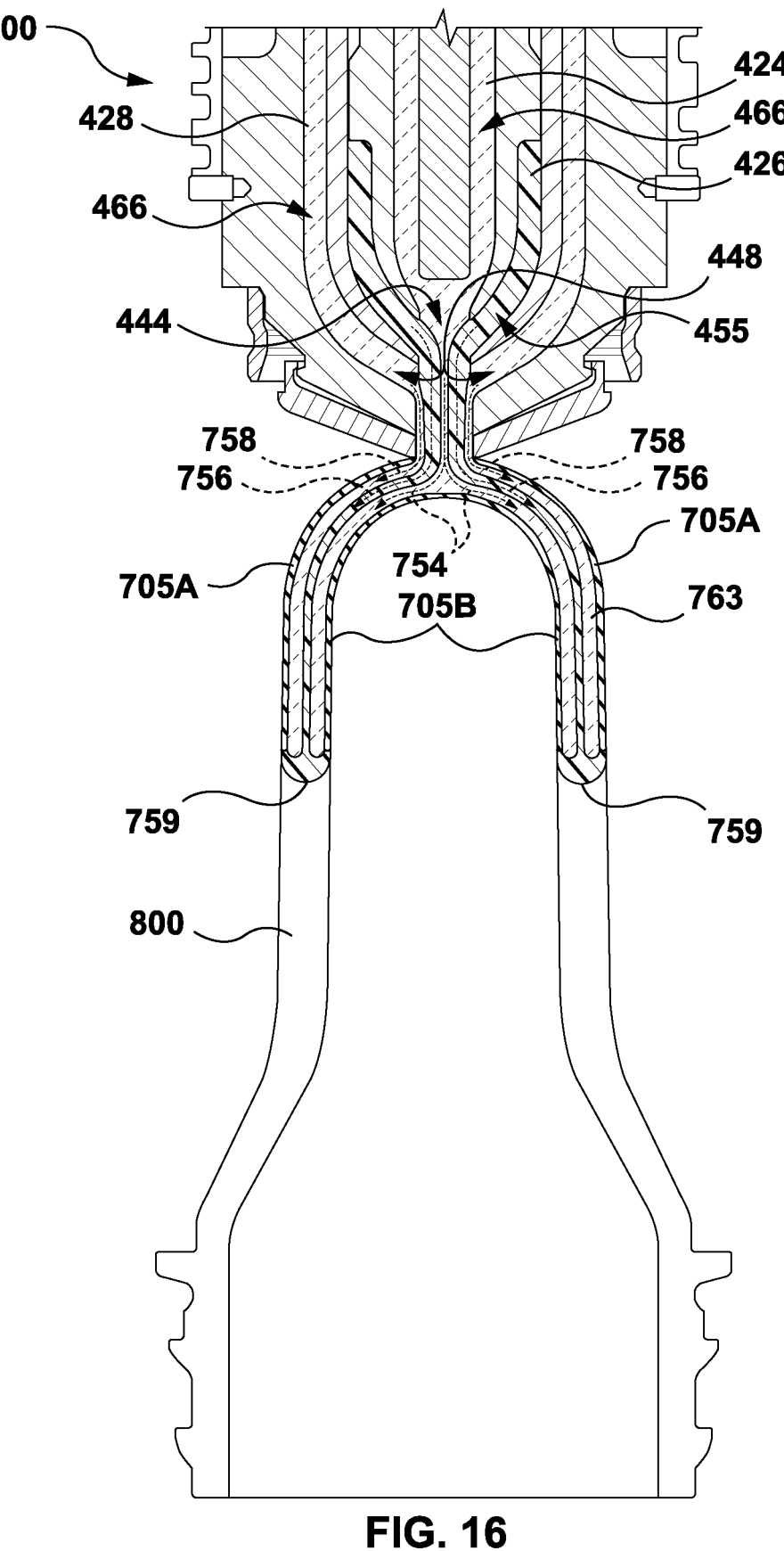

In a subsequent operation 1406 (FIG. 14), injection of internal layer material 466 into mold cavity 800 from the inner and outer outlets 444, 448 of coinjection nozzle 400 is commenced. This is done while the stream 756 of surface layer material 455 continues to be injected into mold cavity 800 from the intermediate outlet 446. The two resultant streams or layer of 754, 758 of internal layer material 466 sandwich the stream of surface layer material and flow behind the melt front 759. The sandwiched stream 756 continues to supply the melt front 759 with surface layer material 455 at least until the melt front 759 nears a distal end the mold cavity 800, e.g. has reached the mold cavity area that defines the neck finish of the preform (or, more generally, has reached the mold cavity area that defines the neck of the molded article). FIG. 16 shows the state of the nozzle 400 and mold cavity 800 while operation 1406 is underway.

By virtue of the timing of operation 1406 (relative to operation 1404) and the injection rates of injection units 104 and 106 (in operations 1404 and 1406), two conditions are produced within the mold cavity 800.

The first condition is that, as the melt front 759 flows to the distal end of the mold cavity 800, the stream 756 of surface layer material 455 from intermediate outlet 446 continues to supply the melt front 759 with surface layer material 455. This ensures that the preform taking shape within mold cavity 800 will be entirely encapsulated by a thin outer skin of surface layer material 455 that has "foun-tained" from the melt front 759.

The second condition is that the two injected streams 754, 758 of internal layer material 466 flow closely behind the melt front 759. This condition is intended to maximize the proportion of internal layer material 466 within the preform for the following reasons.

As the melt front 759 advances through the mold cavity 800, a thin outer skin 705 forms from surface layer material 455 that has fountained from the melt front 759 and has quickly cooled and hardened. Referring to FIG. 16, this hardened skin layer on the cavity and core sides of the mold cavity 800 are identified using reference numerals 705A and 705B respectively (collectively skin layer 705).

Because the streams 754, 758 of internal layer material 466 flow closely behind the melt front 759, they pass adjacent to newly hardened skin layers 705B, 705A (respec-tively) and quickly cool. Therefore, the next material to harden, adjacent to outer skin 705, is internal layer material 466. This tends to keep the outer skin layer 705 of surface layer material 455 relatively thin, at least in comparison to the outer layer of surface layer material 455 of convention-ally injection molded multilayer articles.

Meanwhile, the sandwiched stream 756 of surface layer material 455, which tends to flow centrally with respect to the widthwise extent of the mold cavity 800, remains thermally isolated from the outside-in cooling that is under-way. The sandwiched stream 756 accordingly remains com-paratively hot and thus keeps flowing comparatively quickly. This facilitates the continuous supply of surface layer material 455 to melt front 759, even if the amount of injected surface layer material 455 is less than the amount of injected internal layer material 466. The relative width of the streams 754, 756, and 758 may be controlled by setting the relative volumetric flow rates of the internal material 466 and surface material 455. For example, if the internal material flow rate is higher than the surface material flow rate, then the width of the streams 754 and 758 may be wider than stream 756.

Referring to FIG. 14, in a subsequent operation 1408, injection of internal layer material 466 is terminated. In the present embodiment, this is done by suitably controlling internal layer material injection unit 106 to cease injection. The timing of this operation may depend in part upon the expected speed and volume of the melt front 759. In some embodiments, the injection of internal layer material 466 may be terminated when the cavity is almost filled, e.g. when the melt front 759 is likely to have reached the neck finish or thread area of the preform cavity.

Figure 17:
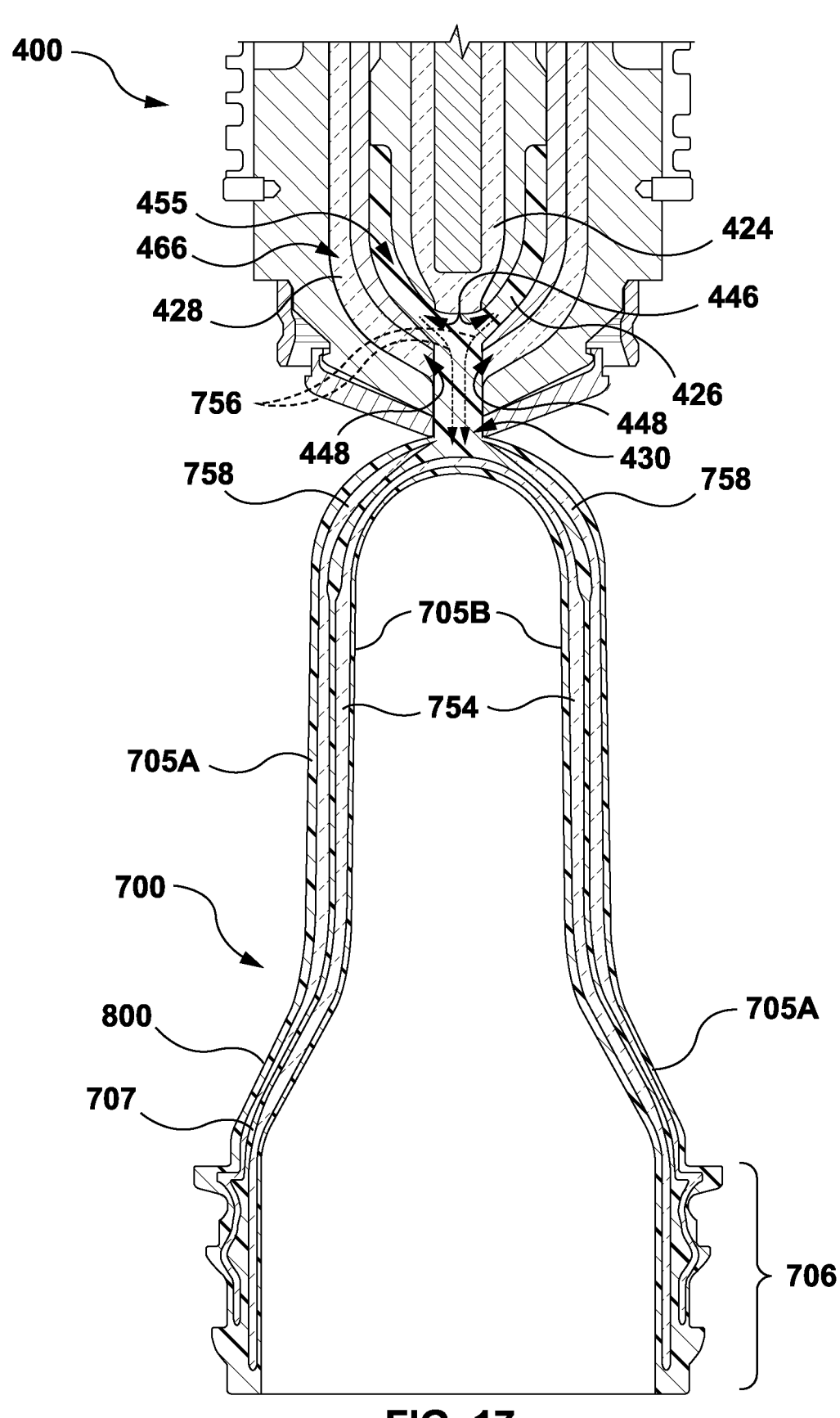

FIG. 17 shows the state of the nozzle 400 and mold cavity 800 resulting from operation 1408. As illustrated, a con-tainer preform 700 is now almost fully formed within the mold cavity 800. Following cessation of internal layer material injection unit 106, some minor "tailing" (thinning or tapering) of the trailing edge of the material 466 from outer outlet 448 may occur. The stream 756 of surface layer material 455 continues to be injected from intermediate outlet 446, albeit possibly at a slower rate as the mold cavity 800 fills and the newly formed preform cools. This may be considered as a hold or packing phase of operation, in which the base area 704 (described below) is packed with surface layer material 455 at the conclusion of the injection molding cycle.

It will be appreciated that the middle layer of surface layer material 455 may be thicker in the domed base area 704 than in the body portion 702 (described below) due to a hold or packing operation performed by the surface layer material injection unit 104 at the end of an injection molding cycle. The hold or packing operation may push internal layer material 466 away from the gate area 430 of nozzle 400 towards the body of preform 700.

It will further be appreciated that the middle layer 707 of surface layer material 455 may be thicker in the neck finish area 706 than in the body portion 702 because of the volume of surface layer material 455 in melt front 759 that is ahead of the internal layer streams 754 and 758 (see e.g. FIG. 16). The volume of surface layer material 455 at melt front 759 may be needed to ensure the internal layer streams 754 and 758 do not overtake the melt front. The precise volume of surface layer material 455 that may be required at melt front 759 may depend on various factors, such as the injection speed of the surface and internal layer materials 455 and 466, the timing of internal layer material 466 injection, the temperature of materials 455 and 466, and the leading edge shape variation of internal layer material 466. The latter term refers to the possible non-uniformity ("waviness") of the melt front of the internal layer material streams 754 and 758 radially across the preform circumference. More specifically, if the melt front of the internal layer material streams 754 and 758 is wavy, then the amplitude of the wave may also play a part in determining the volume of surface material 455 that should be in melt front 759.

In operation 1410 (FIG. 14), the inner outlet 444 and outer outlet 448 of the coinjection nozzle 400 are backfilled with surface layer material 455 in preparation for the next molding cycle. Operation 1410 may be implemented as follows. With surface layer material injection unit 104 in a "hold phase" in which surface layer material 455 is still under positive pressure and flowing (albeit slowly) from intermediate outlet 446, the controller 108' causes the internal layer material injection unit 106 to pull back slightly. The pullback has the effect of reducing a pressure of the internal layer material 466 within each of the inner channel 424 and the outer channel 428. The reduced pressure in turn allows a small amount of pressurized surface layer material 455 from intermediate outlet 446 to flow upstream into the distal ends of the inner channel 424 and outer channel 428. For clarity, the backfilling of the distal end of inner channel 424 may advantageously prevent internal layer material 466 from being trapped near inner outlet 444.

After operation 1410, the controller 108' causes valve stem 432 to return to its original, fully closed position, i.e. Position 0. This closure has the effect of trapping a small amount of surface layer material in the distal ends of the inner channel 424 and the outer channel 428, in preparation for the next molding cycle. In the result, the nozzle 400 will be returned to its initial state of FIG. 13.

It will be appreciated that alternative embodiments of the injection molding machine 100 might implement operation 1400 slightly differently based on the design of the coinjection nozzle of the molding machine. For example, in some embodiments, the coinjection nozzle may have an annulus of clearance between the valve stem and each of the intermediate outlet and the outer outlet. Such embodiments could achieve backfilling of the distal end of their outer channels, even if their valve stems cannot mechanically trap surface layer material 455 at the distal end of the outer channel as described in operation 1410.

Figure 18:
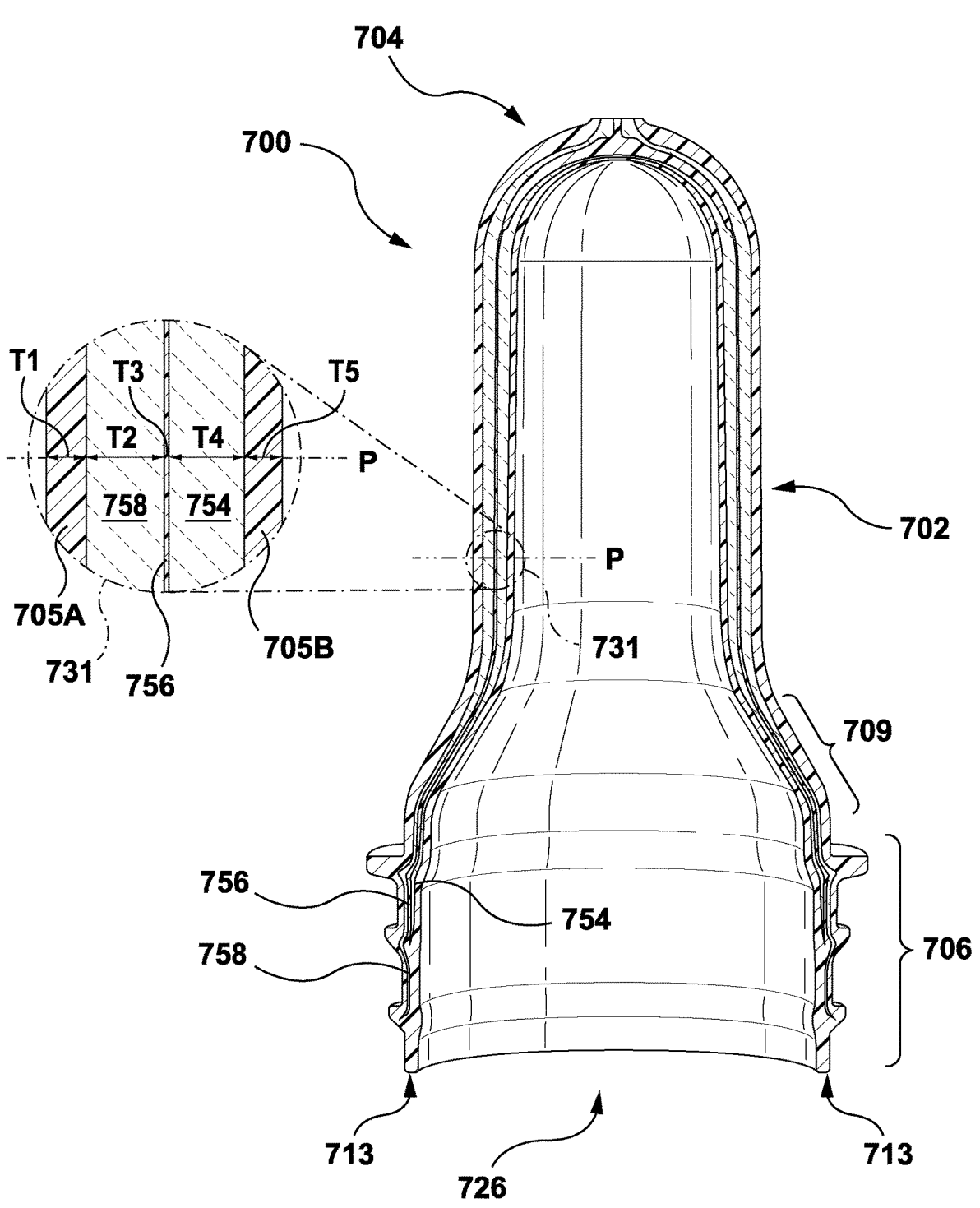
FIGS. 18 and 19 are longitudinal cross sections of sample multilayer preforms made according to the flowchart of operation of FIG. 14.

FIG. 18 is a longitudinal cross section of a sample multilayer preform 700 made according to operation 1400 of FIG. 14 using a machine identical or similar to machine 100'. In the sample preform 700, both the surface layer material 455 and the internal layer material 466 are PET, possibly with distinct colorants added to each material (e.g. titanium dioxide (white) and black colorants added to materials 455 and 466, respectively). Like preform 600, preform 700 has a tubular body 702, a domed base 704 at a closed end of the tubular body, a neck finish 706 at an open end 726 of the tubular body defining a top sealing surface 713. The neck finish 706 of this example preform includes various external features including threads for accepting and retaining a closure such as a threaded cap, an anti-pilfer bead, and a support ledge (not expressly labeled in FIG. 18). The neck finishes of alternative embodiments can vary and may include only a subset of these features or possibly none of these features. The body has a transition area 709 which is not necessarily present in alternative embodiments.

As best seen in the enlarged area 731 of FIG. 18, the preform wall in the body portion 702 is made up of five adjacent layers: an outer skin layer 705A, an outer internal layer 758, a middle layer 756, an inner internal layer 754, and an inner skin layer 705B, in that order. Layers 705A, 756, and 705B are made from surface layer material 455, and layers 758 and 754 are made from internal layer material 466. In FIG. 18, the middle three layers 758, 756 and 754 are identified using the same reference numerals as the respective streams of material from which they were formed (see FIG. 16). Put another way, the tubular body 702 comprises a middle layer 756 of surface layer material 455 sandwiched by two layers 754, 758 of internal layer material 466 and an encapsulating skin 705 of the surface layer material 455.

In the enlarged area 731, reference numerals T1, T2, T3, T4, and T5 denote the thicknesses of layers 705A, 758, 756, 754, and 705B respectively measured along a plane P orthogonal to the preform wall. In this sample preform 700, the sum of the thicknesses of the internal layer material layers 758, 754 is at least 50% of the overall thickness of the preform wall. It will be appreciated that this is significantly thicker than the internal layer 632 in the body portion 602 of preform 600 (FIG. 11) made using the conventional approach of FIG. 5. The reason that layer 756 may appear thin compared to the other layers may be due to the profile of the injection speed of the surface layer material 455. In particular, the injection speed may be reduced during the injection cycle to extend the fill time of the surface layer material 455. This may be done to promote encapsulation of the internal layer material 466 by the surface layer material 455 by causing injection of internal layer material 466 to terminate before injection of surface layer material 455 terminates. In the illustrated embodiment, the layer 756 of surface layer material 455 thins to the point of not being readily visible immediately above the enlarged area 731 within the preform wall. The reason for this thinning may be that, during the relevant time of the injection molding cycle, the injection rate of surface layer material 455 was low, such that the molding material entering the molding cavity was primarily internal layer material 466.

Preform 700 also differs structurally from known injection-molded multilayer preforms, such as preforms 600 or 600', in other respects.

Firstly, the sum of the thicknesses of the two layers 758, 754 of internal layer material 466 in the base area 704 of preform 700 is approximately double the thickness of the single internal layer 632 of internal layer material 466 in the base area 604 of the conventional preform 600 (FIG. 11A). More specifically, the sum of the thicknesses of layers 758, 754 is about 20% of the overall thickness of the base 704 in this embodiment. The thickness of internal layer material 466 in the base area 704 could be increased, e.g. by slowing the rate of material injection of both the internal and surface layer materials to increase the frozen layer thickness of the internal layer material 466 in the base area 704. The thickness of internal layer material 466 in the base area 704 may also be impacted by the internal layer shot size and the duration of the surface layer material hold phase.

A thicker internal material layer within the base of a multilayer preform may provide benefits unavailable in conventional multilayer preforms. For example, if the internal layer material 466 is a barrier material, e.g. for blocking light, the increased thickness of internal layer material 466 in the base area may correspond to greater opacity. Greater opacity may be desirable for some applications, e.g. to hide package contents from view or to protect contents from the possibly detrimental effects of excessive light exposure.

Secondly, the middle layer 756 of surface layer material 455 from the body portion 702 extends through the neck finish 706 to form the top sealing surface 713 thereof. Conventionally injection-molded preforms, such as preform 600 of FIG. 11, lack this feature.

In FIG. 18, the outer layer 758 of internal layer material 466 extends further into the neck finish area 706 than the inner layer 754 of internal layer material 466. The reason for this discrepancy may be that, during the backfilling operation (1410, FIG. 14) of the previous molding cycle, surface layer material 455 was drawn further up into inner channel 424 than into outer channel 428. In that scenario, the internal layer material 466 within the outer stream 758 will have a "head start" in comparison to the internal layer material 466 within the inner stream 754. In contrast, FIG. 17 depicts the opposite scenario, which could alternatively occur. In some embodiments, the extent of these layers within the neck finish area 706 may be substantially the same.

Notably, the proportion of internal layer material 466 within preform 700 by volume is approximately 54%, which is significantly higher than the proportion of internal layer material 466 within conventionally made multilayer preforms 600 or 600'.

Thus, despite the fact that the material comprising preform 700 may harden just as quickly in injection molding machine 100' as the material forming preforms 600 or 600' did in injection molding machine 100, the preform 700 formed by machine 100' will contain more internal layer material 466 than a preform formed by machine 100. Accordingly, preforms 700 having a high proportion of internal layer material may be manufactured with little or no loss of machine throughput compared to preforms 600 or 600'.

Figure 19:
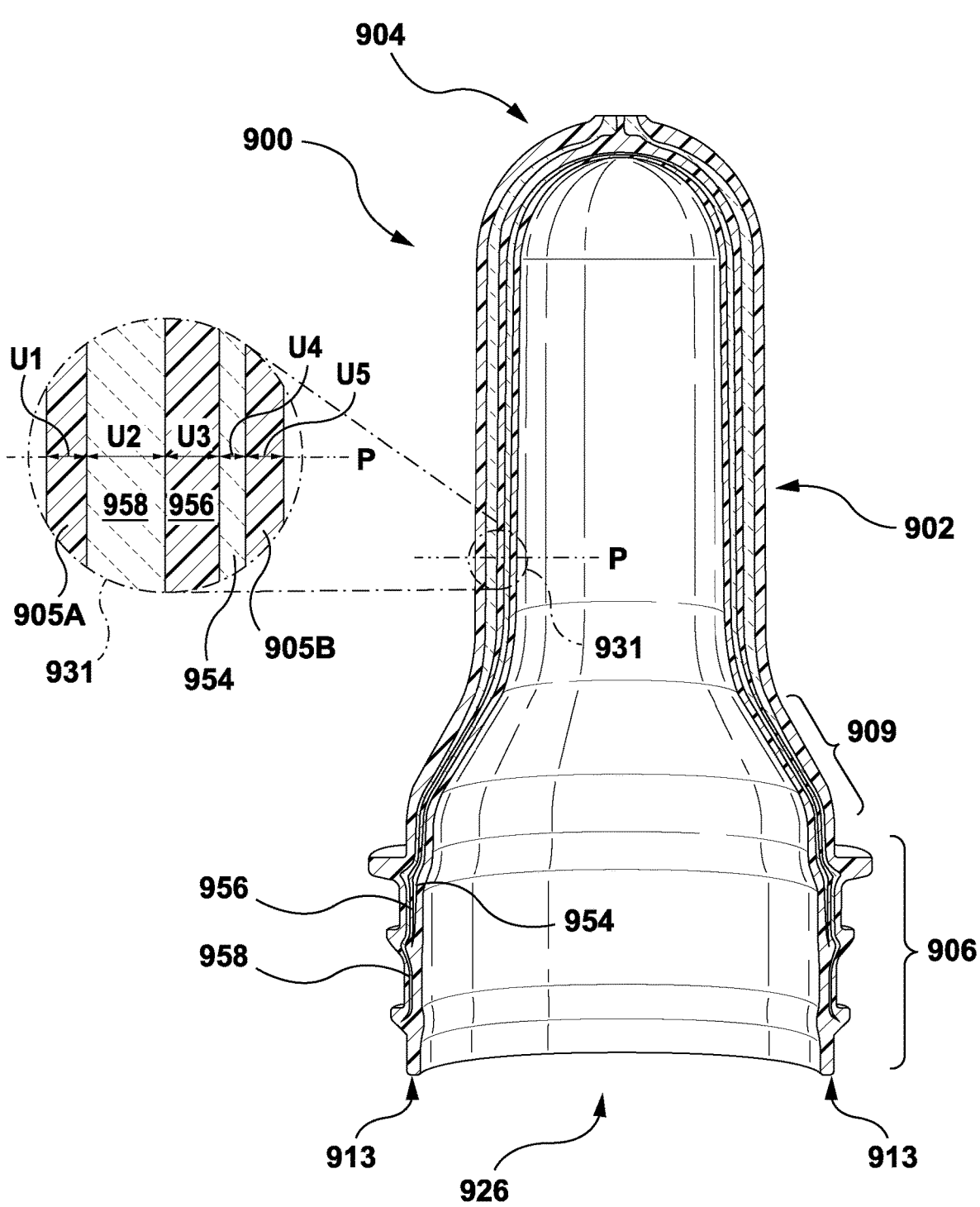

FIG. 19 is a longitudinal cross section of another sample multilayer container preform 900 made according to operation 1400 of FIG. 14 using a machine similar or identical to machine 100'. Like preform 700, the sample preform 900 is made of PET, optionally with distinct colorants having been added to the surface layer material 455 and the internal layer material 466 respectively. Container preform 900 has a tubular body 902, a domed base 904 at a closed end of the tubular body, and a neck finish 906 at an open end 926 of the tubular body defining a top sealing surface 913. The body portion 902 has a transition area 909 which is not necessarily present in alternative embodiments.

As best seen in the enlarged area 931 of FIG. 19, the preform wall in the body portion 902 is made up of five adjacent layers: an outer skin layer 905A, an outer internal layer 958, a middle layer 956, an inner internal layer 954, and an inner skin layer 905B, in that order. Layers 905A, 956, and 905B are made from surface layer material 455, and layers 958 and 954 are made from internal layer material 466. Reference numerals U1, U2, U3, U4, and U5 denote the thicknesses of layers 905A, 958, 956, 954, and 905B respectively measured along a plane P orthogonal to the preform wall. Inner and outer skin layers 905A, 905B may be collectively referred to as skin layer 905.

It will be appreciated that one difference between preform 900 and preform 700 of FIG. 18 is in the thicknesses of layers 956, 954 in the body portion 902 as compared the thicknesses of layer 756, 754 respectively of body portion 702. In particular, the thickness U3 of the surface layer material layer 956 of preform 900 is several times the extent of thickness T3 of the internal layer material layer 756 of preform 700. This may be due, at least in part, to a smaller shot size of surface layer material used for molding preform 900 as compared to the shot size of surface layer material in preform 700. Conversely, the thickness U4 of the internal layer material layer 954 of preform 900 is less than half the extent of thickness T4 of the internal layer material layer 756 of preform 700. These differences may be achieved through suitable control of internal layer material injection rates.

It is expected that the thickness sum of layers 905A, 956 and 905B will be approximately constant for a given shot size of surface layer material 455. If the surface layer material shot size (i.e. the amount of surface layer material 455 injected during the molding of a preform) increases, then the layer 956 thickness may increase. Similarly, sum of the thicknesses of layers 958 and 954 may be a function of the shot size of internal layer material 466 and should be approximately constant for a given internal layer material shot size. The ratio of layer thickness 954 and 958 could be changed by restricting the flow of layer 954 from channel 424 (FIG. 17) by closing the channel with the valve stem 432. The total sum of layers 958 and 954 would remain the same, but layer 954 would be thinner and 958 would be thicker by substantially the same amount.

The thicknesses U1, U2, and U5 of the other layers 905A, 958, and 905B of preform 900 are not notably different from the corresponding thicknesses T1, T2, and T5 of the layers 705A, 758, and 705B of preform 700.

The ratio of internal layer material 466 to surface layer material 455 is higher in preform 700 than in preform 900. The optimal ratio may be application-specific.

Various alternative embodiments are contemplated.

The above-described molding machines 100 and 100' are both for molding multilayer articles that are preforms. In alternative embodiments, the molding machine may be intended for molding other types of multilayer articles, e.g. other types of containers or closures such as lids. In the case of closures, the area referred to above as a neck finish may refer to the skirt or neck portion of the closure, and the area referred to above as a top sealing surface may refer to an annular edge surface of the closure.

It will be appreciated that the preforms 700, 900 are only examples of preforms that could be made using operation 1400. Other types of preforms may differ in shape or appearance. For example, some preforms may lack a transition area.

In some embodiments, a conventional hot runner, e.g. like hot runner 399, may be used, if the injection units 104, 106 are swapped. The resultant injection molding machine would be similar to injection molding machine 100 of FIG. 1, except that the surface layer material injection unit 104 and internal layer material injection unit 106 would be swapped and the controller 108 would be replaced or reprogrammed to effect operation similar to what is shown in FIG. 14.

The example embodiments discussed above are for injection molding multilayer preforms. It will be appreciated the methods described herein, e.g. operation 1400 of FIG. 14, could be used for injection molding other types of multilayer articles, e.g. coffee pods/capsules, closures, or pails.

In some embodiments, the injection of surface layer material 455 from the intermediate outlet 446 may be terminated before operation 1408 occurs. In such embodiments, the injection molding sequence may conclude with the injection of internal layer material 466 rather than surface layer material 455. This may result in internal layer material 466 being exposed at the exterior surface of the base area of the preform. Such exposure of the internal layer material 466 may be acceptable in some applications, e.g. for aesthetic reasons.

In some embodiments, exposure of internal layer material 466 at an interior or exterior surface of the base area of a preform may be considered acceptable, e.g. for aesthetic reasons. This may be dependent upon factors such as the application for which the article is being molded and the type of internal layer material being used. In such embodiments, the backfilling operation 1410 of FIG. 14 may be omitted.

Other modifications may be made within the scope of the following claims.

What is claimed is:

1. A method of molding a multilayer article, comprising: providing a coinjection nozzle with an inner outlet, an outer outlet, and an intermediate outlet between the inner and outer outlets; from the intermediate outlet of the coinjection nozzle, commencing injection into a mold cavity of a stream of surface layer material and injecting only the surface layer material into the mold cavity, the surface layer material supplying a melt front; then with the injection of the surface layer material stream from the intermediate outlet ongoing, injecting into the mold cavity, from the inner and outer outlets of the coinjection nozzle, two respective streams of internal layer material, the two streams of internal layer material sandwiching the stream of surface layer material and flowing behind the melt front of the surface layer material, so that the sandwiched stream of surface layer material continues to supply the melt front with surface layer material; wherein the surface layer material completely encapsulates the internal layer material.

2. The method of molding a multilayer article of claim 1 wherein the injecting injects an amount of internal layer material that is at least 50% by volume of the multilayer article.

3. The method of molding a multilayer article of claim 2 wherein the injecting injects an amount of internal layer material that is about 54% by volume of the multilayer article.

4. The method of molding a multilayer article of claim 1 wherein the injecting injects an amount of internal layer material that is less than 50% by volume of the multilayer article.

5. The method of molding a multilayer article of claim 4 wherein the injecting injects an amount of internal layer material that is about 3% by volume of the multilayer article.

6. The method of claim 1, wherein the sandwiched stream of surface layer material continues to supply the melt front with surface layer material at least until the melt front nears a distal end of the mold cavity.

7. The method of claim 6, wherein the sandwiched stream of surface layer material continues to supply the melt front with surface layer material at least until the melt front reaches a melt cavity area that defines a neck of the multilayer article.

8. A tangible medium storing computer-readable program code that, upon execution by a controller of an injection molding machine having a surface layer material injection unit, an internal layer material injection unit, and a coinjection nozzle with an inner outlet, an outer outlet, and an intermediate outlet between the inner and outer outlets, causes the controller to: cause the surface layer material injection unit to commence injecting a stream of surface layer material from the intermediate outlet of the coinjection nozzle into a mold cavity and inject only the surface layer material into the mold cavity, the surface layer material supplying a melt front; then with the injection of the surface layer material stream from the intermediate outlet ongoing, cause the internal layer material injection unit to commence injecting into the mold cavity, from the inner and outer outlets of the coinjection nozzle, two respective streams of internal layer material sandwiching the stream of surface layer material and flowing behind the melt front of the surface layer material, so that the sandwiched stream of surface layer material continues to supply the melt front with surface layer material; wherein the surface layer material completely encapsulates the internal layer material.

9. The tangible medium of claim 8 wherein the computer-readable program code that, upon execution by the controller, further causes the controller to:

cause a hold pressure to be applied to the surface layer material supplying the intermediate outlet of the coinjection nozzle; and cause a pressure of the internal layer material supplying the inner and outer outlets of the coinjection nozzle to be reduced sufficiently to allow the pressurized surface layer material to flow, in an upstream direction, into each of the inner outlet and the outer outlet.

* * * * *